(12) United States Patent
Suzuki et al.

(10) Patent No.: US 11,126,343 B2
(45) Date of Patent: Sep. 21, 2021

(54) INFORMATION PROCESSING APPARATUS, INFORMATION PROCESSING METHOD, AND PROGRAM

(71) Applicant: Saturn Licensing LLC, New York, NY (US)

(72) Inventors: Seiji Suzuki, Kanagawa (JP); Naoki Saito, Chiba (JP); Kazuto Nishizawa, Kanagawa (JP); Masao Kondo, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/364,892

(22) Filed: Mar. 26, 2019

(65) Prior Publication Data

US 2019/0220163 A1 Jul. 18, 2019

Related U.S. Application Data

(63) Continuation of application No. 15/969,240, filed on May 2, 2018, now Pat. No. 10,331,328, which is a (Continued)

(30) Foreign Application Priority Data

Dec. 26, 2013 (JP) ................................ 2013-270051

(51) Int. Cl.
*G06F 3/0482* (2013.01)
*G06F 3/0485* (2013.01)
*G06F 16/44* (2019.01)

(52) U.S. Cl.
CPC .......... *G06F 3/0485* (2013.01); *G06F 3/0482* (2013.01); *G06F 16/44* (2019.01)

(58) Field of Classification Search
CPC ....... G06F 3/0485; G06F 16/44; G06F 3/0482
See application file for complete search history.

(56) References Cited

U.S. PATENT DOCUMENTS

| | | |
|---|---|---|
| 5,719,637 A | 2/1998 | Ohkura et al. |
| 5,737,029 A | 4/1998 | Ohkura et al. |
| (Continued) | | |

FOREIGN PATENT DOCUMENTS

| | | |
|---|---|---|
| CN | 1241866 A | 1/2000 |
| CN | 1335950 A | 2/2002 |
| (Continued) | | |

OTHER PUBLICATIONS

Japanese Office Action for JP2018168905 dated Sep. 24, 2019.
(Continued)

*Primary Examiner* — Andrea C Leggett
(74) *Attorney, Agent, or Firm* — Lerner, David, Littenberg, Krumholz & Mentlik, LLP

(57) ABSTRACT

Provided is an information processing apparatus including an operation detection unit configured to detect a user's operation, and a display control unit configured to display content in a part including a middle of a display screen and display thumbnails corresponding to content belonging to one category in one direction along one side of the display screen in a region located separately from the middle of the display screen. The display control unit moves the displayed thumbnails in a vertical direction with respect to the one direction according to an operation which is detected by the operation detection unit and is an operation of switching the one category to which the content corresponding to the displayed thumbnails belongs.

12 Claims, 12 Drawing Sheets

Related U.S. Application Data continuation of application No. 14/570,186, filed on Dec. 15, 2014, now Pat. No. 10,191,644.

(56) References Cited

U.S. PATENT DOCUMENTS

| | | | |
|---|---|---|---|
| 5,903,314 | A | 5/1999 | Niijima et al. |
| 6,976,228 | B2 | 12/2005 | Bernhardson |
| 7,152,210 | B1 | 12/2006 | Van Den Hoven et al. |
| 8,250,604 | B2 | 8/2012 | Unger et al. |
| 8,261,305 | B2 | 9/2012 | Read |
| 8,291,452 | B1 | 10/2012 | Yong et al. |
| 8,473,982 | B2 | 6/2013 | Young et al. |
| 8,837,919 | B2 | 9/2014 | Isozu et al. |
| 8,856,831 | B2 | 10/2014 | Ahn et al. |
| 10,191,644 | B2 | 1/2019 | Suzuki et al. |
| 10,331,328 | B2 | 6/2019 | Suzuki et al. |
| 2002/0075333 | A1 | 6/2002 | Dutta et al. |
| 2003/0001898 | A1 | 1/2003 | Bernhardson |
| 2003/0090524 | A1 | 5/2003 | Segerberg et al. |
| 2004/0233238 | A1 | 11/2004 | Landesmaki |
| 2005/0210410 | A1 | 9/2005 | Ohwa et al. |
| 2006/0212833 | A1 | 9/2006 | Gallagher et al. |
| 2007/0150830 | A1 | 6/2007 | Ording et al. |
| 2007/0160345 | A1 | 7/2007 | Sakai et al. |
| 2007/0239566 | A1 | 10/2007 | Dunnahoo et al. |
| 2008/0235737 | A1 | 9/2008 | Read |
| 2009/0199241 | A1 | 8/2009 | Unger et al. |
| 2009/0265628 | A1 | 10/2009 | Bamford et al. |
| 2009/0284551 | A1 | 11/2009 | Stanton |
| 2011/0047512 | A1 | 2/2011 | Onogi et al. |
| 2012/0056830 | A1* | 3/2012 | Suzuki ............... G06F 3/0488 345/173 |
| 2012/0141088 | A1 | 6/2012 | Isozu et al. |
| 2013/0024895 | A1 | 1/2013 | Yong et al. |
| 2013/0332960 | A1 | 12/2013 | Young et al. |
| 2014/0047392 | A1* | 2/2014 | Kim ............... G06F 3/04812 715/846 |
| 2014/0289676 | A1 | 9/2014 | Yoritate et al. |
| 2015/0186002 | A1 | 7/2015 | Suzuki et al. |
| 2018/0246627 | A1 | 8/2018 | Suzuki et al. |
| 2019/0354258 | A1 | 11/2019 | Suzuki et al. |

FOREIGN PATENT DOCUMENTS

| | | |
|---|---|---|
| CN | 1670679 A | 9/2005 |
| CN | 101893980 A | 11/2010 |
| CN | 101998084 A | 3/2011 |
| CN | 102713812 A | 10/2012 |
| CN | 103150089 A | 6/2013 |
| EP | 0767418 B1 | 1/2003 |
| EP | 2296370 A1 | 3/2011 |
| JP | H04019793 A | 1/1992 |
| JP | H08140007 A | 5/1996 |
| JP | H08279966 A | 10/1996 |
| JP | H09037170 A | 2/1997 |
| JP | 2003512668 A | 4/2003 |
| JP | 2004349949 A | 12/2004 |
| JP | 2005202482 A | 7/2005 |
| JP | 2005328241 A | 11/2005 |
| JP | 2006271003 A | 10/2006 |
| JP | 2006304291 A | 11/2006 |
| JP | 2009521754 A | 6/2009 |
| JP | 2010061600 A | 3/2010 |
| JP | 2010515978 A | 5/2010 |
| JP | 2010258712 A | 11/2010 |
| JP | 2010538400 A | 12/2010 |
| JP | 2011041219 A | 2/2011 |
| JP | 2011103028 A | 5/2011 |
| JP | 2011192126 A | 9/2011 |
| JP | 2012027797 A | 2/2012 |
| JP | 2012059222 A | 3/2012 |
| JP | 2012066991 A | 4/2012 |
| JP | 2012238258 A | 12/2012 |
| JP | 2013223045 A | 10/2013 |
| JP | 2013238955 A | 11/2013 |
| WO | 9957890 A1 | 11/1999 |
| WO | 0042497 A1 | 7/2000 |
| WO | 0129702 A2 | 4/2001 |
| WO | 2009034611 A1 | 3/2009 |
| WO | 2010087203 A1 | 8/2010 |

OTHER PUBLICATIONS

Japanese Office Action for Application No. 2018-168905 dated May 28, 2019.
BRAVIA electronic manual, the Internet (URL: http://www.sony.jp/support/tv/i-manual/x9200a/jpn/c_selchl_zapui.html).
Extended European Search Report for EP Application No. 14197528.4, dated Apr. 30, 2015.
Japanese Office Action for JP Application No. 2013270051, dated Dec. 8, 2015.
Japanese Office Action for JP Application No. 2013270051, dated Feb. 16, 2016.
Japanese Office Action for JP Application No. 2016-102557, dated Sep. 19, 2017.
Japanese Office Action of Japanese Application No. 2016102557 dated Feb. 13, 2018.
Summons to Attend Oral Proceedings Under Rule 115(1) for EP 14197528.4 dated May 15, 2018.
Extended European Search Report including Written Opinion for EP18166833.6 dated May 29, 2018.
Japanese Office Action for Japanese Application No. 2016102557 dispatched Jun. 12, 2018.
Chinese Office Action for Application No. 2014107993369, dated Jul. 24, 2018.
Office Action for Chinese Patent Application No. 2014107993369 dated Aug. 3, 2018.
Japanese Office Action for Application No. 2016-102557 dated Oct. 16, 2018.
Chinese Search Report for Application No. 201910812554 dated Apr. 1, 2020, 1 page.

* cited by examiner

INFORMATION PROCESSING APPARATUS, INFORMATION PROCESSING METHOD, AND PROGRAM

CROSS REFERENCE TO RELATED APPLICATIONS

The present application is a continuation of U.S. patent application Ser. No. 15/969,240, filed on May 2, 2018, which is a continuation of U.S. patent application Ser. No. 14/570,186, filed on Dec. 15, 2014, which claims the benefit of Japanese Priority Patent Application No. JP2013-270051, filed on Dec. 26, 2013, the disclosures of which are hereby incorporated herein by reference.

BACKGROUND

The present disclosure relates to an information processing apparatus, an information processing method, and a program.

In recent years, with the development of information communication technologies, display apparatuses displaying content acquired through communication have been developed and become generally widespread. For example, television receivers acquiring content from servers via the Internet or the like and displaying the acquired content can be exemplified.

The above-mentioned display apparatuses generally display a content list or the like so that users can select content to be displayed among the acquired content. For example, "BRAVIA electronic manual, the Internet (URL: http://www.sony.jp/support/tv/i-manual/x9200a/jpn/c_selchl_zapui.html)" discloses a television receiver that displays a list of displayable content and displays selected content.

SUMMARY

However, since there is a large amount of content obtainable via the Internet or the like, it is difficult to increase the amount of content corresponding to a content list displayed for retrieval without interfering with display of content currently being viewed for the purpose of retrieving content to be subsequently displayed while viewing the current content. For this reason, users sometimes perform complicated operations while taking some time to search for content which the users desire to display.

It is desirable to provide a novel and improved information processing apparatus, a novel and improved information processing method, and a novel and improved program so that users can efficiently retrieve content.

According to an embodiment of the present disclosure, there is provided an information processing apparatus including an operation detection unit configured to detect a user's operation, and a display control unit configured to display content in a part including a middle of a display screen and display thumbnails corresponding to content belonging to one category in one direction along one side of the display screen in a region located separately from the middle of the display screen. The display control unit moves the displayed thumbnails in a vertical direction with respect to the one direction according to an operation which is detected by the operation detection unit and is an operation of switching the one category to which the content corresponding to the displayed thumbnails belongs.

According to another embodiment of the present disclosure, there is provided an information processing method including detecting a user's operation, displaying content in a part including a middle of a display screen, displaying thumbnails corresponding to content belonging to one category in one direction along one side of the display screen in a region located separately from the middle of the display screen, and moving the displayed thumbnails in a vertical direction with respect to the one direction according to a detected operation of switching the one category to which the content corresponding to the displayed thumbnails belongs.

According to another embodiment of the present disclosure, there is provided a program causing a computer to realize an operation detection function of detecting a user's operation, and a display control function of displaying content in a part including a middle of a display screen, displaying thumbnails corresponding to content belonging to one category in one direction along one side of the display screen in a region located separately from the middle of the display screen, and moving the displayed thumbnails in a vertical direction with respect to the one direction according to an operation which is detected by the operation detection function and is an operation of switching the one category to which the content corresponding to the displayed thumbnails belongs.

According to embodiments of the present disclosure described above, there are provided an information processing apparatus, an information processing method, and a program capable of automatically selecting an imaging apparatus to be controlled. The foregoing advantageous effects are not necessarily restrictive, but any advantageous effect desired to be obtained in the present specification or other advantageous effects understood from the present specification may be obtained along with the foregoing advantageous effects or instead of the foregoing advantageous effects.

DETAILED DESCRIPTION OF THE EMBODIMENTS

Figure 1:
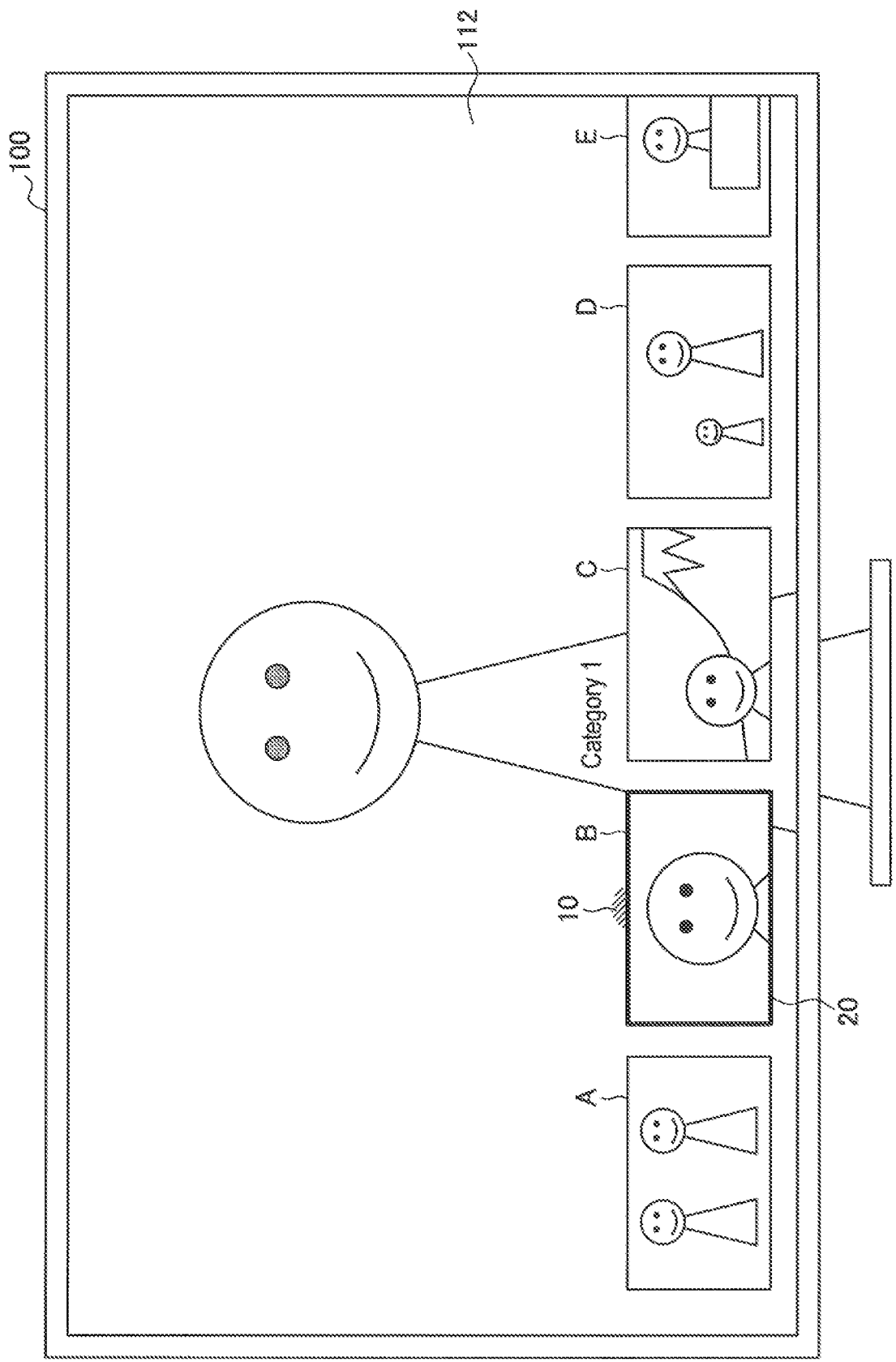
FIG. 1 is a diagram for describing an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The Description will be made in the Following Order.
1. Overview of information processing apparatus according to embodiment of the present disclosure
2. Embodiment of the present disclosure
   2-1. Configuration of information processing apparatus according to embodiment
   2-2. Process of information processing apparatus according to embodiment
   2-3. Modification examples of embodiment
3. Hardware configuration of information processing apparatus according to embodiment of present disclosure
4. Conclusion <1. Overview of Information Processing Apparatus According to Embodiment of the Present Disclosure>

First, an overview of an information processing apparatus according to an embodiment of the present disclosure will be described with reference to FIG. 1. FIG. 1 is a diagram for describing the overview of the information processing apparatus according to the embodiment of the present disclosure.

An information processing apparatus 100 includes a display unit 112 and displays content on the display unit 112. The information processing apparatus 100 displays objects used to select content displayed on the display unit 112 on the display unit 112. For example, the objects can be thumbnails corresponding to the content. Therefore, the information processing apparatus 100 can display the thumbnails while displaying the content.

For example, as illustrated in FIG. 1, the information processing apparatus 100 can display the content on the display unit 112 and display thumbnails A to E used to select content to be displayed in a superimposed manner.

Here, when there are a plurality of pieces of display target content, the number of thumbnails to be displayed increases according to the number of pieces of content. When the number of thumbnails increases, a user performs a complicated operation such as an operation of confirming the thumbnails one by one to retrieve content which the user desires to view. On the other hand, when display of content being reproduced is hidden to retrieve the content, convenience for the user may be impaired. Accordingly, the information processing apparatus 100 determines a category to which display target content belongs and displays thumbnails (hereinafter also referred to as thumbnails corresponding to a category) corresponding to the content belonging to one category, while the content being reproduced is displayed. Further, the information processing apparatus 100 switches one category to which the content corresponding to the thumbnails to be displayed belongs according to a user's operation.

For example, the information processing apparatus 100 displays thumbnails A to E belonging to one certain category ("Category 1"). When the user performs an operation of switching a category, the information processing apparatus 100 displays the thumbnails corresponding to the content belonging to the category "Category 1" being displayed and thumbnails of content belonging to a switching destination category.

Thus, the information processing apparatus 100 according to the embodiment of the present disclosure displays the thumbnails corresponding to the content belonging to the one category, while displaying the content, and switches the one category to which the content corresponding to the thumbnails being displayed belongs according to the user's operation. Therefore, the user can confirm the thumbnails corresponding to the content according to a category without his or her convenience being impaired, and thus efficient content retrieval is possible. In FIG. 1, a television receiver is illustrated as an example of the information processing apparatus 100. However, the information processing apparatus 100 may be a tablet terminal, a personal computer, or the like.

<2. Embodiment of the Present Disclosure>

[2-1. Configuration of Information Processing Apparatus According to Embodiment]

Figure 2:
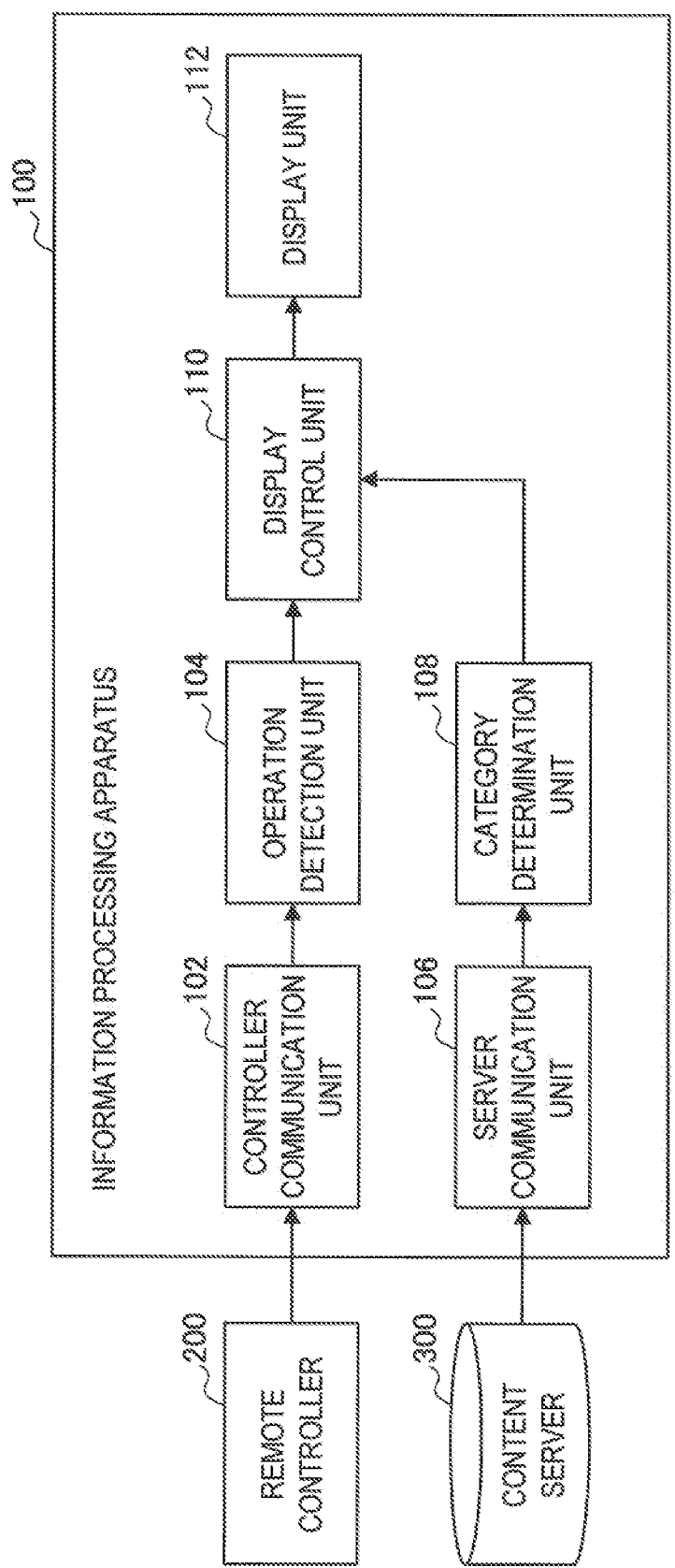
FIG. 2 is a block diagram illustrating a schematic functional configuration of the information processing apparatus according to an embodiment of the present disclosure.

The overview of the information processing apparatus 100 according to the embodiment of the present disclosure has been described above. Next, the configuration of the information processing apparatus 100 according to the embodiment of the present disclosure will be described with reference to FIG. 2. FIG. 2 is a block diagram illustrating a schematic functional configuration of the information processing apparatus 100 according to an embodiment of the present disclosure.

As illustrated in FIG. 2, the information processing apparatus 100 includes a controller communication unit 102, an operation detection unit 104, a server communication unit 106, a category determination unit 108, a display control unit 110, and a display unit 112.

The controller communication unit 102 communicates with a remote controller 200 which is operated by the user. Specifically, the controller communication unit 102 receives operation information which is information regarding the information processing apparatus 100 and is transmitted from the remote controller 200. For example, the controller communication unit 102 can communicate with the remote controller 200 using short range wireless communication such as infrared rays, Bluetooth (registered trademark), or WiFi (registered trademark). The remote controller 200 can be a touch pad type or button type remote controller.

The operation detection unit 104 detects operation details on the information processing apparatus 100. Specifically, the operation detection unit 104 detects operation details based on the operation information which is the information regarding the information processing apparatus 100 and is received by the controller communication unit 102.

The server communication unit 106 communicates with a content server 300 that delivers content. Specifically, the server communication unit 106 acquires display target content and content information from the content server 300 through communication. The content information can include text information indicating an overview or the like of the content, category information to which the content belongs, and thumbnails. The content server 300 delivers content corresponding to an acquisition request from the server communication unit 106.

The category determination unit 108 determines a category to which the content acquired by the server communication unit 106 belongs. Specifically, the category determination unit 108 determines a category to which the content belongs with reference to the category included in the content information acquired along with the content by the server communication unit 106. For example, the category can be current broadcast progress, favorites, terrestrial digital television broadcast, moving-image delivery from the Internet, or the like.

Figure 3:
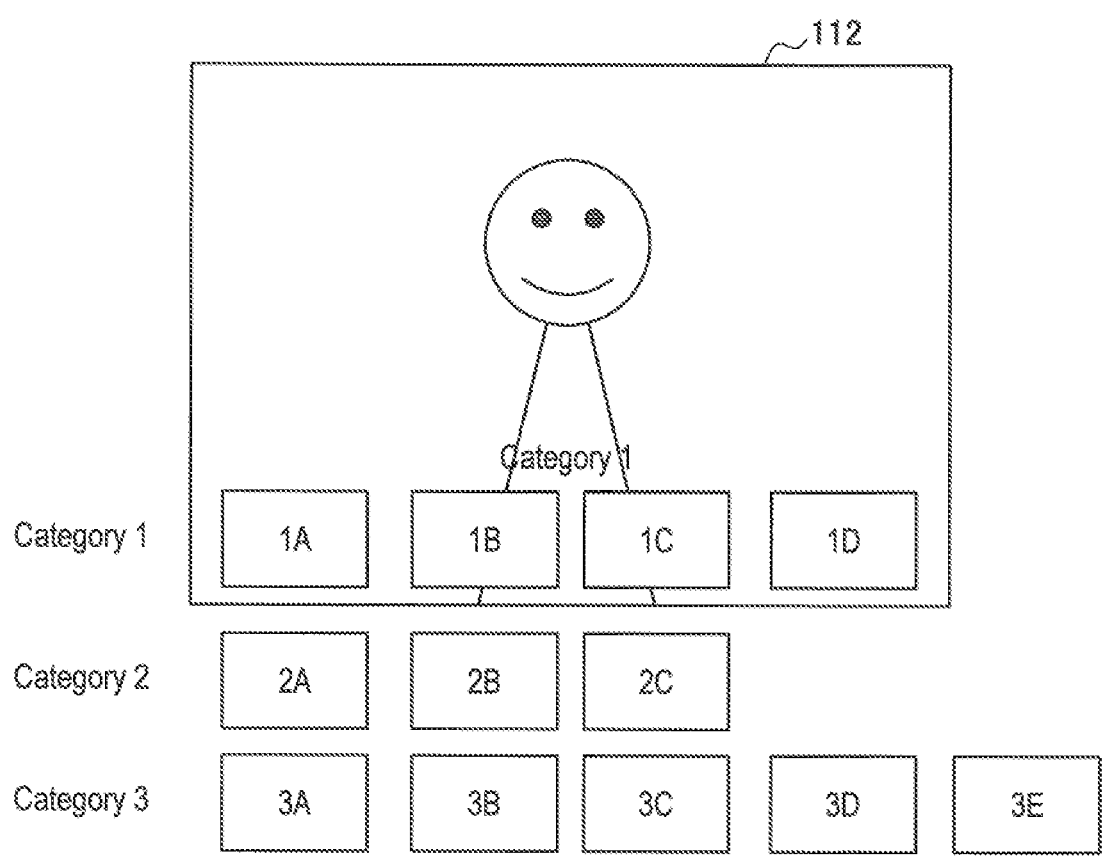
FIG. 3 is an image diagram for describing an example of a thumbnail display process of the information processing apparatus according to the embodiment.

The display control unit 110 causes the display unit 112 to display the content and thumbnails corresponding to reproducible content according to a user's operation. Specifically, when the operation detection unit 104 detects a content display operation, the display control unit 110 displays content using the entire display screen of the display unit 112 as a display region. When a thumbnail display operation is detected by the operation detection unit 104, the display control unit 110 displays thumbnails of content belonging to one category so that the thumbnails are superimposed on the content being displayed. When the operation detection unit 104 detects a category switching operation, the display control unit 110 moves the thumbnails being displayed in a vertical direction with respect to an arrangement direction of the thumbnails and changes thumbnails to be displayed to thumbnails of content belonging to a switching destination category. The foregoing thumbnail display process will be described in detail with reference to FIG. 3. FIG. 3 is an image diagram for describing an example of a thumbnail display process of the information processing apparatus 100 according to the embodiment.

(Thumbnail Display Process)

First, when the user performs a thumbnail display operation, the display control unit 110 acquires thumbnails of content belonging to one category set in initial display. For example, as illustrated in FIG. 3, when the thumbnail display operation is detected by the operation detection unit 104, the category determination unit 108 determines a category with reference to the category information included in the content information and specifies content belonging to the category "Category 1". Then, the display control unit 110 acquires thumbnails 1A to 1D of the specified content from the content information.

Next, the display control unit 110 causes the display unit 112 to display a category name and the acquired thumbnails. For example, as illustrated in FIG. 3, the display control unit 110 can cause the display unit 112 to display the category name "Category 1" and the acquired thumbnails 1A to 1D of the content belonging to the category "Category 1".

Next, when the user performs a category switching operation, the display control unit 110 acquires thumbnails of content belonging to a switching destination category. For example, when the operation detection unit 104 detects an operation of switching the category to a subsequent category "Category 2" illustrated in FIG. 3, the category determination unit 108 determines a category with reference to the category information and specifies content belonging to the category "Category 2." Then, the display control unit 110 acquires thumbnails 2A to 2C of the specified content from the content information.

The display control unit 110 switches the category name and the thumbnails to be displayed to the switching destination category name and the acquired thumbnails of the content belonging to the switching destination category. For example, the display control unit 110 can move the thumbnails 1A to 1D of the content belonging to the category "Category 1" illustrated in FIG. 3 to the middle of the screen to erase these thumbnails from the display screen and cause the display unit 112 to display the acquired thumbnails 2A to 2C of the content belonging to the category "Category 2" shown below the category "Category 1" of FIG. 3.

The thumbnail display operation and the category switching operation can be, for example, flicking operations in the touch pad type remote controller 200 or operations of pressing category switching buttons in the button type remote controller 200. For example, when the thumbnails are displayed as in FIG. 3, the display control unit 110 displays the thumbnails 1A to 1D corresponding to the content belonging to the category "Category 1" through an upward flicking operation on the touch pad type remote controller 200. When an upward flicking operation is further performed, the display control unit 110 switches the category to the category "Category 2" and displays the thumbnails 2A to 2C. When the thumbnails 2A to 2C are displayed and a downward flicking operation is performed in this state, the display control unit 110 switches the category to the immediately previous category "Category 1". When thumbnails set as initial display are displayed and a thumbnail display operation is performed in this state, the display control unit 110 ends the display of the thumbnails. For example, when the thumbnails are displayed as in FIG. 3 and a downward flicking operation is performed in the display state of the thumbnails 1A to 1D corresponding to the content belonging to the category "Category 1", the display control unit 110 ends the display of the thumbnails.

(Display Region of Thumbnails)

The display control unit 110 displays the thumbnails in a narrow region in the display screen. Specifically, the display control unit 110 displays the thumbnails in one direction along one side of the display screen in a region which is a region located distant from the middle of the display screen and is a smaller region than a display region of the content displayed on the display screen. For example, as illustrated in FIG. 1, the display control unit 110 can display the thumbnails A to E in the horizontal direction along the lower side of the display screen in a region which is a region located below the middle of the display screen and is a smaller region than the display region of the content displayed on the display screen. Therefore, it is possible to display the thumbnails without interfering with the display of the content being reproduced.

(Focus Display of Thumbnail)

Figure 4:
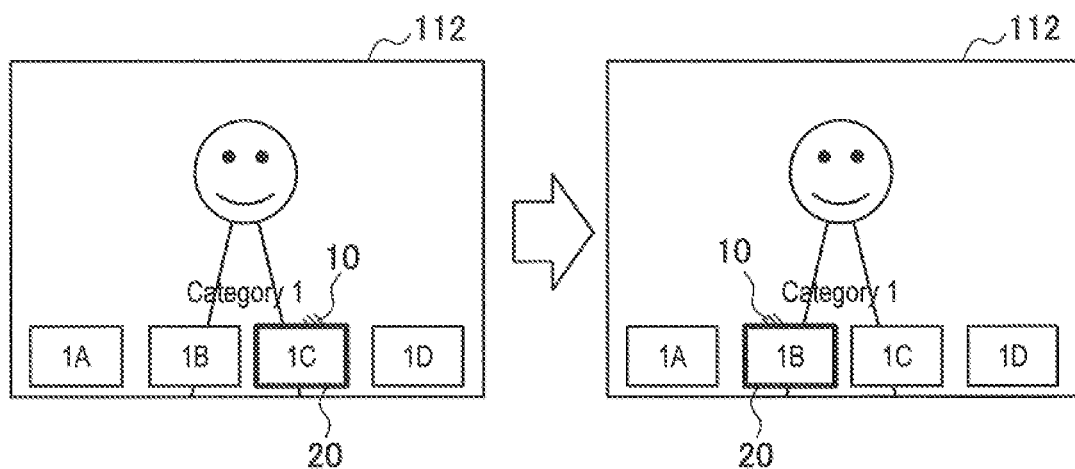
FIG. 4 is a diagram illustrating focus display for thumbnails of the information processing apparatus according to the embodiment.

The display control unit 110 performs display to clearly show a selected thumbnail. Specifically, the display control unit 110 brings a thumbnail into focus closer to a display position of an operation object moved on the display screen according to a user's operation than the other thumbnails. For example, focus display of a thumbnail will be described with reference to FIG. 4. FIG. 4 is a diagram illustrating focus display for thumbnails of the information processing apparatus 100 according to the embodiment.

The display control unit 110 brings a thumbnail into focus 20 closer to a display position of an operation object, e.g., a cursor, than the other thumbnails. For example, as illustrated in the left drawing of FIG. 4, the display control unit 110 brings the thumbnail 1C into focus 20 closer to the display position of the cursor 10 than the other thumbnails, among the displayed thumbnails 1A to 1D. As illustrated in the right drawing of FIG. 4, the display control unit 110 brings the thumbnail 1B into focus 20 when the display position of the cursor 10 is changed and the thumbnail closer to the display position of the cursor 10 than the other thumbnails is changed to the thumbnail 1B. Therefore, since the user can select the thumbnail brought into focus 20 while confirming the display position of the cursor 10, it is possible to improve operability. In FIG. 4, the focus 20 is expressed by displaying the frame of the thumbnail thicker than those of the other thumbnails, but an embodiment of the present disclosure is not limited thereto. The focus 20 can be expressed by allowing the luminance of the frame of the thumbnail to be higher than that of the other thumbnails or allowing the color of the frame of the thumbnail to be different from those of the other thumbnails.

The example in which the display of the focus 20 is performed based on the display position of the cursor 10 has been described above. However, the display of the focus 20 may be changed based on a movement amount of an operator detected by the operation detection unit 104. Specifically, when a movement amount of an operator detected by the operation detection unit 104 exceeds a predetermined amount, the display control unit 110 brings a thumbnail into focus 20 adjacent to the thumbnail brought into focus 20 in a movement direction of the operator of the thumbnail. For example, when a movement amount of a finger touching an operation surface of the touch pad type remote controller 200 exceeds a predetermined amount, the display control unit 110 moves the focus 20 to a thumbnail adjacent to the thumbnail brought into focus 20 in a movement direction of the finger. Therefore, the thumbnail brought into focus 20 can be changed without displaying the operation object such as the cursor 10. The display of the focus 20 may be changed by pressing a button of the remote controller 200.

(Scrolling of Thumbnails)

Figure 5:
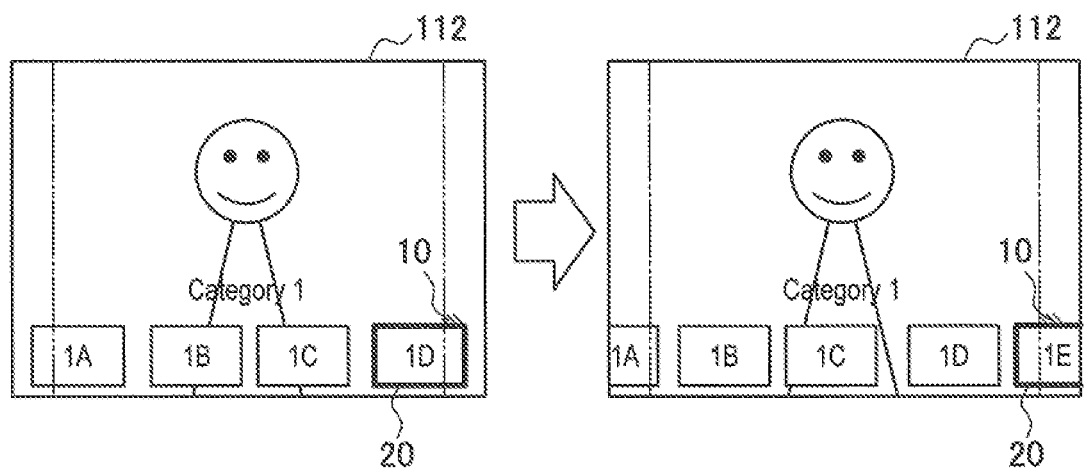
FIG. 5 is a diagram illustrating scrolling of the thumbnails of the information processing apparatus according to the embodiment.

The display control unit 110 performs scrolling of the thumbnails according to a user's operation. Specifically, the display control unit 110 displays an operation object, e.g., the cursor 10, moving on the display screen according to a user's operation. When an operation of placing the cursor 10 at an end region of the display screen in a scrolling direction is performed, the thumbnails of a category corresponding to the displayed thumbnail are scrolled. For example, a thumbnail scrolling process will be described with reference to FIG. 5. FIG. 5 is a diagram illustrating scrolling of the thumbnails of the information processing apparatus 100 according to the embodiment.

First, the display control unit 110 determines whether the display position of the cursor 10 is located at an end region of the display screen. For example, as illustrated in the left drawing of FIG. 5, the display control unit 110 can set end regions in a length direction of the display screen including regions from the ends of the display screen to position (positions of imaginary lines in the left drawing of FIG. 5) of 10% of the length in the length direction of the display screen, as predetermined regions and determine whether the display position of the cursor 10 is inside one of the predetermined regions.

Next, when the display control unit 110 determines that the display position of the cursor 10 is located in one of the end regions of the display screen, the display control unit 110 performs the scrolling of the thumbnails. For example, as illustrated in the right drawing of FIG. 5, when the display control unit 110 determines that the display position of the cursor 10 is located inside one of the above-described predetermined regions, the display control unit 110 moves the displayed thumbnails 1A to 1D in the horizontal direction toward an end of the display screen opposite to the end of the display screen close to the display position of the cursor 10. Then, the display control unit 110 moves the thumbnails 1A to 1D and displays the thumbnail 1E adjacent to the thumbnail 1D while moving the thumbnail 1E.

Thus, the display control unit 110 scrolls the thumbnails when an operation of placing the cursor 10 at an end region of the display screen in the scrolling direction is performed. Therefore, the user can scroll the thumbnails intuitively. The example in which the scrolling is performed when the display position of the cursor 10 is in the end region of the display screen has been described above, but the scrolling may be performed through a drag operation by the touch pad type remote controller 200. For example, when the user performs a drag operation with two of his or her fingers on the touch pad of the touch pad type remote controller 200, the operation detection unit 104 detects this operation and the display control unit 110 performs the scrolling process.

The display control unit 110 allows a movement speed of the thumbnail to be faster when the position of the operation object is a position closer to an end of the display screen in the end region of the display screen in the scrolling direction. For example, the display control unit 110 allows the movement speed of the thumbnail to be faster when the display position of the cursor 10 illustrated in the left drawing of FIG. 5 is a position closer to the end of the display screen than the position of 10% of the length of the display screen from the end of the display screen in the length direction. Therefore, by changing a scrolling speed according to the display position of the cursor 10, the user can adjust the scrolling speed intuitively.

(Thumbnail Selection Process)

When a thumbnail selection operation is performed, the display control unit 110 ends the display of the thumbnails and switches the display of the content being reproduced to content corresponding to the thumbnail subjected to the selection operation. Specifically, when the operation detection unit 104 detects a thumbnail selection operation, the display control unit 110 ends the display of the thumbnails, acquires content corresponding to the thumbnail subjected to the selection operation, and displays the acquired content. For example, the thumbnail selection operation can be a pushing operation on the touch pad or a tapping operation on the touch pad. The thumbnails can be moved and erased in a direction oriented away from the middle of the screen.

Here, when the configuration of the information processing apparatus 100 is described again with reference to FIG. 2, the display unit 112 displays the content and the thumbnails corresponding to the content under the control of the display control unit 110.

[2-2. Process of Information Processing Apparatus According to Embodiment]

Figure 6:
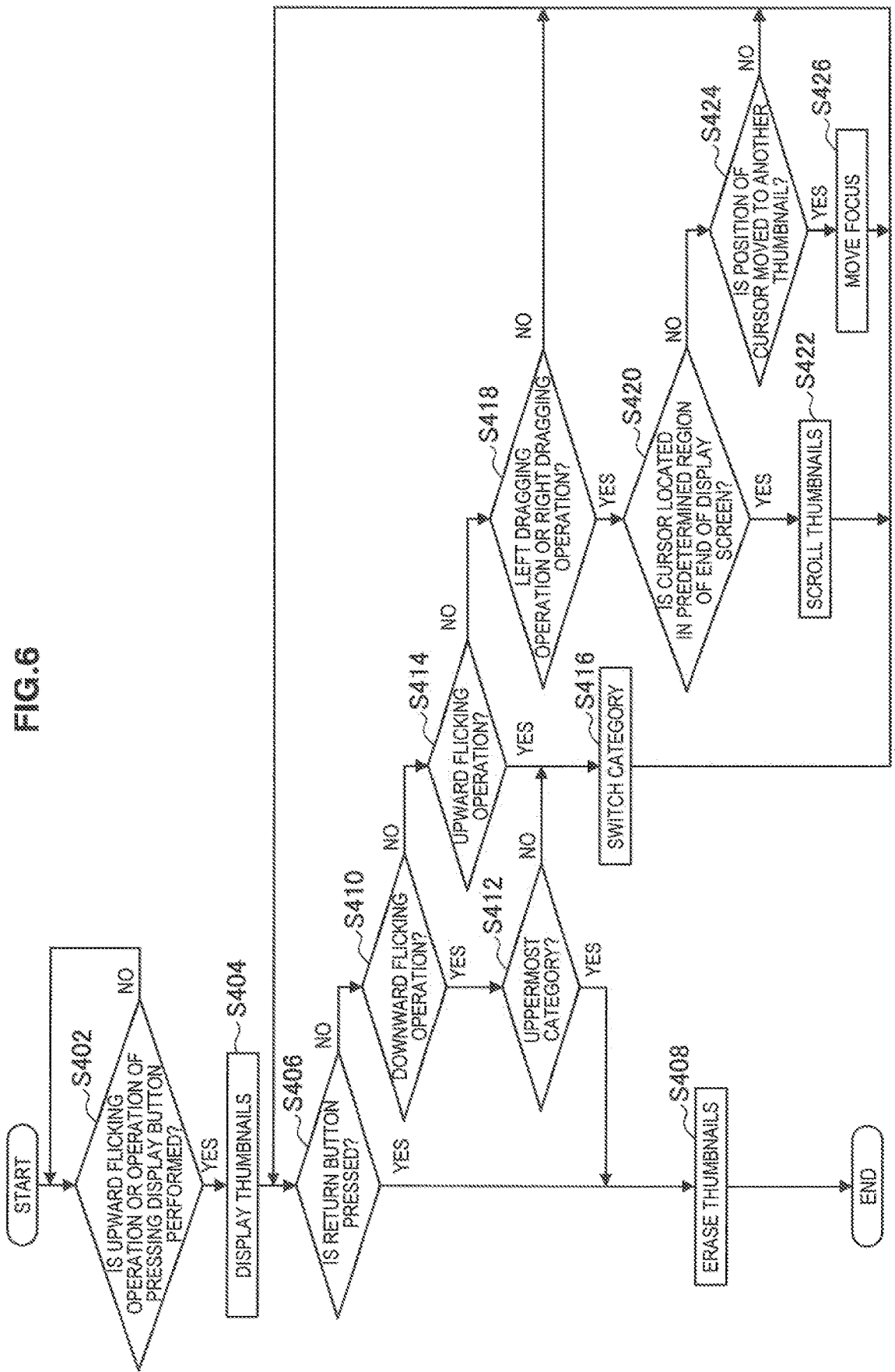
FIG. 6 is a flowchart conceptually illustrating a process of the information processing apparatus according to the embodiment.

Next, a process of the information processing apparatus 100 according to the embodiment will be described with reference to FIG. 6. FIG. 6 is a flowchart conceptually illustrating a process of the information processing apparatus 100 according to the embodiment. The repeated description of the configuration of the above-described information processing apparatus 100 will be omitted.

First, the display control unit 110 waits until an upward flicking operation or an operation of pressing a display button is performed (step S402). Specifically, the display control unit 110 waits until the operation detection unit 104 detects the upward flicking operation or the operation of pressing the display button based on operation information received by the controller communication unit 102.

When the upward flicking operation or the operation of pressing the display button is performed in step S402, the display control unit 110 displays thumbnails (step S404). Specifically, when the operation detection unit 104 detects the upward flicking operation or the operation of pressing the display button, the display control unit 110 causes the display unit 112 to display the thumbnails corresponding to a category set in initial display.

Next, the display control unit 110 determines whether a return button is pressed (step S406). Specifically, when the operation detection unit 104 detects the pressing of the return button, the display control unit 110 determines that the return button is pressed.

When the display control unit 110 determines in step S406 that the return button is pressed, the display control unit 110 erases the thumbnails (step S408). Specifically, the display control unit 110 erases the displayed thumbnails from the display screen and ends the thumbnail display process.

When the display control unit 110 determines in step S406 that the return button is not pressed, the display control unit 110 determines whether a downward flicking operation is performed (step S410). Specifically, when the operation detection unit 104 detects the downward flicking operation, the display control unit 110 determines that the downward flicking operation is performed.

When the display control unit 110 determines in step S410 that the downward flicking operation is performed, the display control unit 110 determines whether the category is an uppermost category (step S412). Specifically, the display control unit 110 determines whether the category corresponding to the displayed thumbnails is the category set in the initial display. When it is determined in step S412 that the category is the uppermost category, the process proceeds to step S408.

When the display control unit 110 determines in step S410 that no downward flicking operation is performed, the display control unit 110 determines whether an upward flicking operation is performed (step S414). Specifically, when the upward flicking operation is detected, the display control unit 110 determines that the upward flicking operation is performed.

When the display control unit 110 determines in step S414 that the upward flicking operation is performed or determines in step S412 that the category is not the uppermost category, the display control unit 110 switches the category (step S416). Specifically, the display control unit 110 switches the displayed thumbnails to thumbnails corresponding to a switching destination category.

When the display control unit 110 determines in step S414 that no upward flicking operation is performed, the display control unit 110 determines whether a left dragging operation or a right dragging operation is performed (step S418). Specifically, when the operation detection unit 104 detects a right or left dragging operation, the display control unit 110 determines that the right or to left dragging operation is performed.

When the display control unit 110 determines in step S418 that the left dragging operation or the right dragging operation is performed, the display control unit 110 determines whether the cursor 10 is located in a predetermined region of an end of the screen (step S420). For example, the display control unit 110 can determine whether the display position of the cursor 10 is located at an end of the display screen with respect to the position of the display screen stored in advance in a storage unit (not illustrated) included separately in the information processing apparatus 100.

When the display control unit 110 determines in step S420 that the cursor 10 is located in the predetermined region of the end of the screen, the display control unit 110 scrolls the thumbnails (step S422). Specifically, the display control unit 110 scrolls the thumbnails of the category corresponding to the displayed thumbnails.

When the display control unit 110 determines in step S420 that the cursor 10 is not located in the predetermined region of the end of the screen, the display control unit 110 determines whether the display position of the cursor 10 is moved to another thumbnail (step S424). Specifically, the display control unit 110 determines whether the thumbnail closer to the display position of the cursor than the other thumbnails is different from the thumbnail brought into focus 20.

When the display control unit 110 determines in step S424 that the display position of the cursor 10 is moved to another thumbnail, the display control unit 110 moves the focus 20 (step S426). Specifically, the display control unit 110 changes the thumbnail brought into focus 20 to the thumbnail closer to the display position of the cursor 10 than the other thumbnails.

After the processes of steps S416, S422, and S426 are performed or when it is determined in step S418 that the left or right dragging operation is not performed, the process returns to step S406.

Thus, in the embodiment of the present disclosure, the thumbnails corresponding to the content belonging to one category are displayed while displaying the content, and the displayed thumbnails are moved according to an operation of switching the one category to which the content corresponding to the displayed thumbnails belongs. Therefore, since the user can confirm the thumbnails corresponding to the content according to the category without his or her convenience being interfered with, the efficient content retrieval is possible. Further, since the thumbnails are moved and the category is switched, it is possible to provide a comfortable operation to the user.

[2-3. Modification Examples of Embodiment]

The first embodiment of the present disclosure has been described above. The embodiment is not limited to the above-described example. First to seventh modification examples of the embodiment will be described below.

First Modification Example

Figure 7:
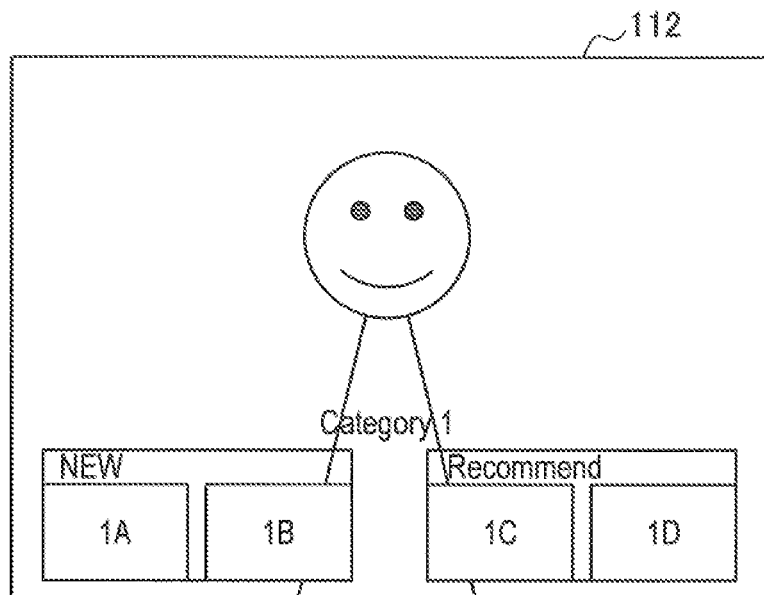
FIG. 7 is a diagram illustrating group display in the information processing apparatus according to a first modification example of the present embodiment.

The display control unit 110 according to the first modification example of the embodiment may display thumbnails so that a user can recognize a group to which content corresponding to the thumbnails belongs. Specifically, the display control unit 110 displays an object indicating a group in the periphery of the thumbnails corresponding to the content belonging to the group. For example, a group display process will be described with reference to FIG. 7. FIG. 7 is a diagram illustrating group display in the information processing apparatus 100 according to the first modification example of the present embodiment.

First, after the display control unit 110 acquires thumbnails through the thumbnail display operation performed by the user, the display control unit 110 determines a group of the acquired thumbnails. For example, the category determination unit 108 determines the category with reference to the category information and specifies the content belonging to the category "Category 1" illustrated in FIG. 7. Then, the display control unit 110 determines the group to which the specified content belongs based on group information included in the content information. The group information includes a group name Next, the display control unit 110 acquires the thumbnails and the group name to which the thumbnails belong from the group information and causes the display unit 112 to display the acquired group name. For example, as illustrated in FIG. 7, the display control unit 110 can display thumbnails 1A and 1B corresponding to content belonging to a group "NEW" as a bundle and display the group name "NEW" above the thumbnails 1A and 1B. Further, the display control unit 110 can display thumbnails 1C and 1D corresponding to content belonging to a group "Recommend" as a bundle and display the group name "Recommend" above the thumbnails 1C and 1D. An object indicating the group may also be, for example, an image.

Thus, according to the first modification example of the embodiment, the display control unit 110 displays the thumbnails so that the user can recognize the group to which the content corresponding to the thumbnails belongs. Therefore, since the user can visually understand the group to which the content in the same category belongs, the efficient content retrieval is possible.

Further, the display control unit 110 displays the group name in the periphery of the thumbnails corresponding to the content belonging to the group. Therefore, since the user can understand the details of the group, the more efficient content retrieval is possible.

The foregoing group information can be generated by the content server 300. For example, the information processing apparatus 100 can record viewing information corresponding to viewed content and transmit the viewing information to the content server 300. Then, the content server 300 can generate the group information based on the viewing information received by the content server 300.

Specifically, the display control unit 110 stores the viewing information of the content in a storage unit or the like separately included in the information processing apparatus 100 and the server communication unit 106 transmits the viewing information to the content server 300. The viewing information includes, for example, content information of the content currently being viewed or viewing history of the content.

The content server 300 analyzes the received viewing information and generates the group information of the content. For example, the content server 300 can add information indicating that many viewers view content, e.g., a group name "Most Viewed", to the group information in regard to the content which is determined to be viewed by many viewers at that time as the result obtained by analyzing the plurality of pieces of viewing information. The content server 300 can add information indicating recommendation, e.g., a group name "Recommend", to the group information in regard to content which is determined to be a favorite of viewers based on a viewing history.

The foregoing group information can be generated through a registration operation on the content by the user. For example, the information processing apparatus 100 can include a separate registration unit (not illustrated). When the user performs the registration operation on the content, the registration unit can register, for example, a group name "Favorite" as group information to the content information of the content subjected to the registration operation.

The example in which the display control unit 110 displays the object indicating the group, e.g., the group name, has been described above. However, the display control unit 110 may not display the object and may allow a distance between the thumbnails corresponding to different groups to be greater than a distance of the thumbnails corresponding to the same group. For example, as illustrated in FIG. 7, the display control unit 110 can allow a distance between the thumbnails 1B and 1C corresponding to different groups to be greater than a distance between the thumbnails 1A and 1B corresponding to the same group. In this case, since an object such as a group name is not displayed, it is possible to improve visibility of the content being reproduced.

Second Modification Example

Figure 8:
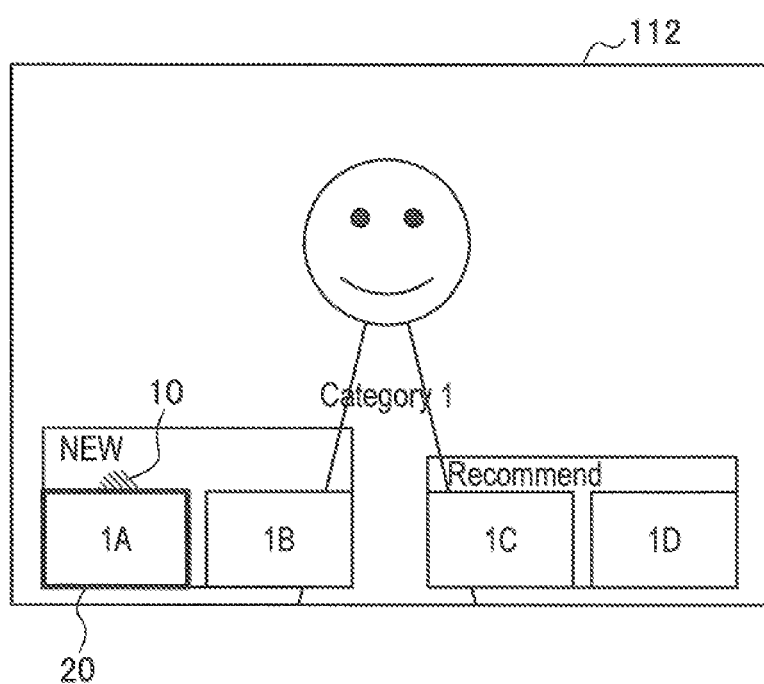
FIG. 8 is a diagram illustrating emphasized display of a group name in the information processing apparatus according to a second modification example of the present embodiment.

As a second modification example of the embodiment, in addition to the foregoing first modification example, the display control unit 110 may emphasize display of an object indicating a group to which content corresponding to a thumbnail subjected to a selection operation belongs when the operation detection unit 104 detects the selection operation of selecting the thumbnail. Specifically, when the operation detection unit 104 detects movement of the cursor 10, the display control unit 110 specifies a thumbnail closer to the display position of the cursor 10 than the other thumbnails and emphasizes display of a group name indicating a group corresponding to the thumbnail. For example, emphasized display of a group name will be described with reference to FIG. 8. FIG. 8 is a diagram illustrating emphasized display of a group name in the information processing apparatus 100 according to the second modification example of the present embodiment.

First, the display control unit 110 displays thumbnails and an object indicating a group corresponding to the thumbnails. For example, as illustrated in FIG. 8, the display control unit 110 displays the thumbnails 1A and 1B corresponding to the group "NEW" and the thumbnails 1C and 1D corresponding to the group "Recommend".

Next, when the operation detection unit 104 detects movement of the cursor 10, the display control unit 110 specifies the thumbnail closer to the display position of the cursor 10 than the other thumbnails and emphasizes the display of the object indicating the group corresponding to the specified thumbnail. For example, when the operation detection unit 104 detects movement of the cursor 10, as illustrated in FIG. 8, the display control unit 110 moves the display position of the group name "NEW" of the group corresponding to the thumbnail 1A closer to the display position of the cursor 10 than the other thumbnails in the vertical direction by a predetermined amount. Thus, by moving the display position of the group name in the vertical direction by the predetermined amount, it is possible to prevent the cursor 10 and the group name from overlapping each other. The example in which the display control unit 110 moves the group name in the vertical direction by the predetermined amount has been described above. However, the display control unit 110 may change the group name itself or the size, the color, the shape, the luminance, or the like of the group name Thus, according to the second modification example of the embodiment, the display control unit 110 emphasizes the display of the object indicating the group to which the content corresponding to the thumbnail subjected to the selection operation belongs when the operation detection unit 104 detects the selection operation of selecting the thumbnail. Therefore, since the user can visually recognize the group corresponding to the selected thumbnail easily, it is possible to further improve the efficiency of the content retrieval.

Third Modification Example

Figure 9:
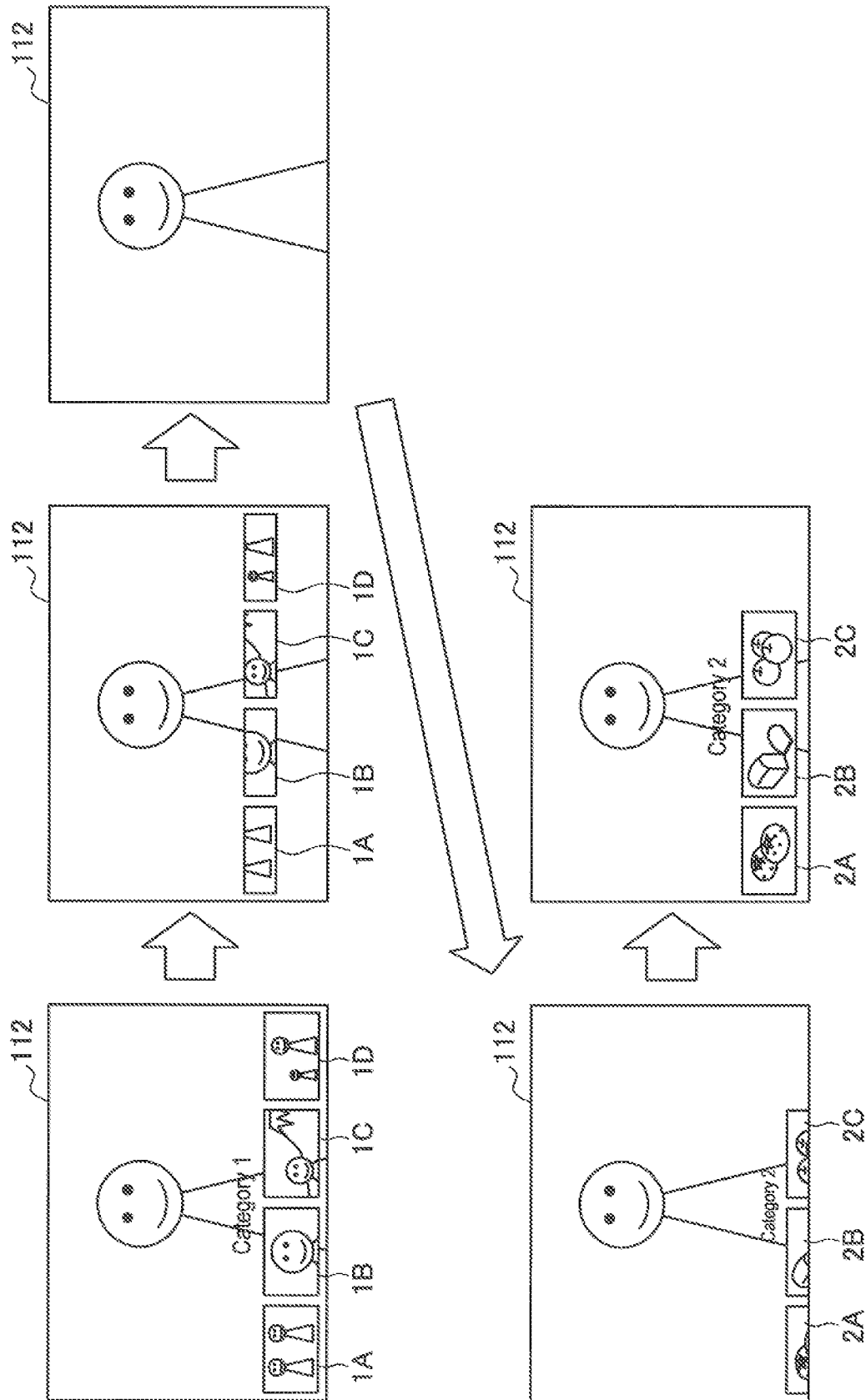
FIG. 9 is a diagram illustrating an example of a change in the display of thumbnails at the time of switching of a category in the information processing apparatus according to a third modification example of the present embodiment.

As a third modification example of the embodiment, when the display control unit 110 moves thumbnails according to a user's operation detected by the operation detection unit 104, the display control unit 110 may move the succeeding thumbnails later than the earlier moved thumbnails. Specifically, after the display control unit 110 moves the displayed thumbnails in the vertical direction with respect to a direction in which the thumbnails are displayed at the time of switching of a category, the display control unit 110 displays the thumbnails corresponding to content belonging to a subsequently displayed category while moving the thumbnails in the vertical direction with respect to the direction in which the thumbnails are displayed. For example, a change in display of thumbnails at the time of switching of a category will be described with reference to FIG. 9. FIG. 9 is a diagram illustrating an example of a change in the display of the thumbnails at the time of switching of a category in the information processing apparatus 100 according to the third modification example of the present embodiment.

First, when the operation detection unit 104 detects a thumbnail display operation, the display control unit 110 displays a category name of a category set in initial display, and arranges and displays thumbnails corresponding to the category in one line. For example, as illustrated in the left drawing of the upper end of FIG. 9, the display control unit 110 can display the category name "Category 1" of the category set in the initial display, and arrange and display the thumbnails 1A to 1D corresponding to the category in the horizontal direction below the category name.

Next, when the operation detection unit 104 detects a category switching operation, the display control unit 110 erases the category name and the thumbnails while moving the displayed category name and thumbnails in the vertical direction with respect to the direction in which the thumbnails are displayed. For example, as illustrated in the middle drawing of the upper end of FIG. 9, when the operation detection unit 104 detects the category switching operation, the display control unit 110 erases the displayed category name "Category 1" and thumbnails 1A to 1D while moving the category name "Category 1" and the thumbnails 1A to 1D in the direction oriented toward the middle of the screen. Then, as illustrated in the right drawing of the upper end of FIG. 9, the category name "Category 1" and the thumbnails 1A to 1D are erased from the display screen. The display control unit 110 can gradually delay a movement speed of the category name and the thumbnails from start to end of the movement. In this case, by erasing the category name and the thumbnails so that aftereffects remain, it is possible to improve comfort of an operation provided to the user.

Next, the display control unit 110 displays a category name and thumbnails corresponding to a switching destination category while moving the category name and the thumbnails in the same direction as the movement direction of the category name and the thumbnails corresponding to the category before the switching. For example, as illustrated in the left drawing of the lower end of FIG. 9, the display control unit 110 displays a category name "Category 2" and thumbnails 2A to 2C corresponding to the switching destination category in the direction oriented toward the middle of the screen, after the thumbnails 1A to 1D corresponding to the category name "Category 1" before the switching are erased. At the time of the start of the display, the category name can be displayed to be smaller than the size of the category name displayed at the time of the end of the movement and can be displayed to be gradually enlarged according to a movement distance. Then, as illustrated in the right drawing of the lower end of FIG. 9, the display control unit 110 moves the category name "Category 2" and the thumbnails 2A to 2C up to the positions at which the category name and the thumbnails corresponding to the category before the switching are displayed.

Thus, according to the third modification example of the embodiment, the display control unit 110 moves the succeeding thumbnails by delaying the movement time with respect to the earlier moved thumbnails when the display control unit 110 moves the thumbnails according to the user's operation detected by the operation detection unit 104. Therefore, by impressing upon the user that the thumbnails are moved through the user's operation, it is possible to improve operability.

After the display control unit 110 moves the displayed thumbnails in the vertical direction with respect to the direction in which the thumbnails are displayed at the time of switching of the category, the display control unit 110 displays the thumbnails corresponding to content belonging to the subsequently displayed category while moving the thumbnails in the vertical direction with respect to the direction in which the thumbnails are displayed. Therefore, since a gap up to the display of the thumbnails or the like corresponding to the switching destination category is opened, it is possible to suggest to the user that the thumbnails displayed before the switching of the category and the thumbnails displayed after the switching of the category are different thumbnails corresponding to different categories.

Fourth Modification Example

Figure 10:
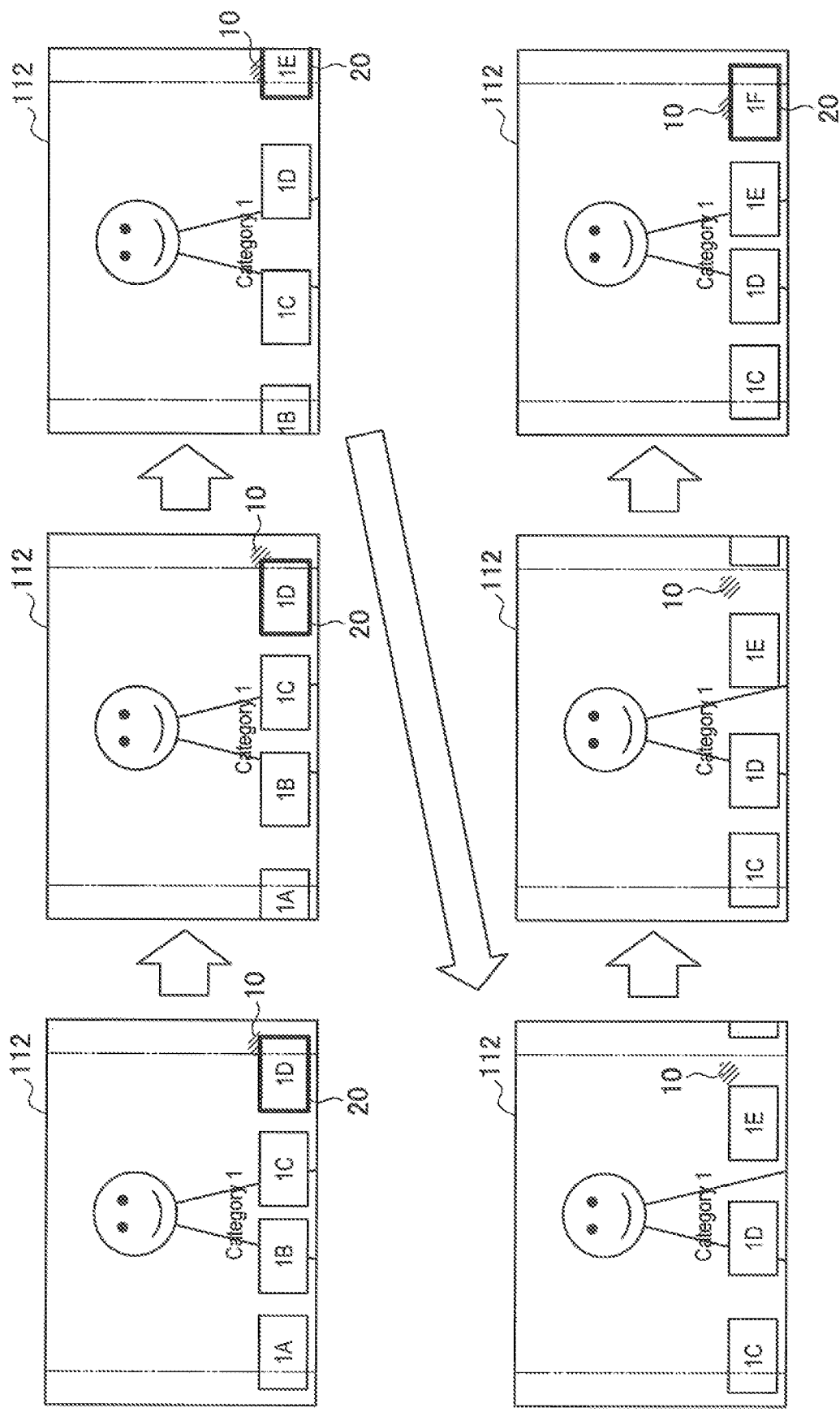
FIG. 10 is a diagram illustrating an example of a change in the display of the thumbnails at the time of scrolling in the information processing apparatus according to a fourth modification example of the present embodiment.

As a fourth modification example of the embodiment, when the operation detection unit 104 detects a scrolling operation, the display control unit 110 may move the thumbnails in an opposite direction to a scrolling direction by delaying the thumbnails in the scrolling direction more than the thumbnails in the opposite direction to the scrolling direction. For example, a change in display of the thumbnails at the time of scrolling will be described with reference to FIG. 10. FIG. 10 is a diagram illustrating an example of a change in the display of the thumbnails at the time of scrolling in the information processing apparatus 100 according to the fourth modification example of the present embodiment.

First, when the operation detection unit 104 detects movement of the cursor 10, the display control unit 110 determines whether the display position of the cursor 10 is located at an end region of the display screen. For example, when the operation detection unit 104 detects the movement of the cursor 10, the display control unit 110 acquires the display position of the cursor 10 illustrated in the left drawing of the upper end of FIG. 10 and determines whether the display position of the cursor 10 is at an end of the display screen with respect to a position of 10% of the length of the display screen in the length direction from the end of the display screen.

When the display control unit 110 determines that the display position of the cursor 10 is located at the end region of the display screen, the display control unit 110 moves the thumbnails in the opposite direction to the scrolling direction while delaying a speed at the time of start of the movement when the thumbnail is the thumbnail displayed at a more distant position in the scrolling direction. For example, the display control unit 110 determines that the display position of the cursor 10 is located at a right end region of the display screen and moves the thumbnails 1A to 1D by delaying the movement speed in order of the thumbnails 1A to 1D, as illustrated in the middle drawing of the upper end of FIG. 10.

Next, after starting to move the thumbnails, the display control unit 110 displays the subsequent thumbnail of the thumbnail closer to the end of the display screen in the scrolling direction than the other thumbnails in the arrangement order while moving the thumbnail in the opposite direction to the scrolling direction. For example, as illustrated in the right drawing of the upper end of FIG. 10, after starting to move the thumbnail 1D closer to the end of the display screen in the scrolling direction than the other thumbnails, the display control unit 110 can display the subsequent thumbnail 1E of the thumbnail 1D while moving the subsequent thumbnail 1E in the opposite direction to the scrolling direction.

Next, when the operation detection unit 104 detects movement of the cursor 10, the display control unit 110 determines whether the display position of the cursor 10 is located at an end region of the display screen. For example, when the operation detection unit 104 detects the movement of the cursor 10, the display control unit 110 acquires a display position of the cursor 10 illustrated in the left drawing of the lower end of FIG. 10 and determines whether the display position of the cursor 10 is at an end of the display screen with respect to the position of 10% of the length of the display screen in the length direction from the end of the display screen.

When the display control unit 110 determines that the display position of the cursor 10 is not located at the end region of the display screen, the display control unit 110 stops the thumbnails in the order of the thumbnails in the opposite direction to the scrolling direction. For example, the display control unit 110 can determine that the display position of the cursor 10 is not located at the right end region of the display screen and can stop the thumbnail moved up to a stop position in the order of the thumbnails 1C to 1F, as illustrated in the middle drawing of the lower end of FIG. 10. Then, as illustrated in the left drawing of the lower end of FIG. 10, the display control unit 110 can stop the movement of all of the thumbnails and end the scrolling.

Thus, according to the fourth modification example of the embodiment, when the operation detection unit 104 detects the scrolling operation, the display control unit 110 moves the thumbnails in the opposite direction to the scrolling direction by delaying the thumbnails in the scrolling direction more than the thumbnails in the opposite direction to the scrolling direction. Therefore, by displaying the thumbnails so that the thumbnail is attracted to the other thumbnails to be moved or stopped, live movement is provided in the scrolling display, and thus it is possible to provide a comfortable operation to the user.

The example in which the display control unit 110 changes the speeds of the thumbnails at the time of the start of the movement according to the display positions of the thumbnails has been described. However, the display control unit 110 may change movement start times of the thumbnails according to the display positions of the thumbnails. For example, in the left drawing of the upper end of FIG. 10, the display control unit 110 can move the thumbnails by delaying the movement start time in the order of the thumbnails 1A to 1D. In this case, by further clarifying the delay of the movement of the thumbnail, the user can easily recognize this animation.

Fifth Modification Example

Figure 11:
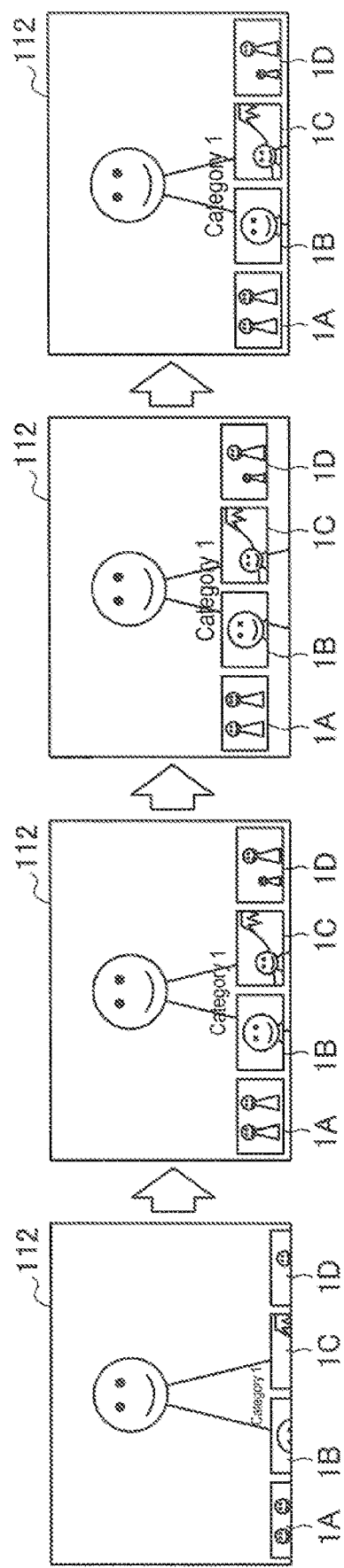
FIG. 11 is a diagram illustrating an example of a change in display at the time of initial display of the thumbnails in the information processing apparatus according to a fifth modification example of the present embodiment.

As a fifth modification example of the embodiment, the display control unit 110 may display the thumbnails by overshooting the movement of the thumbnails at the time of initial display of the thumbnails. Specifically, after the display control unit 110 displays the thumbnails while moving the thumbnails in a direction oriented toward the middle of the screen at the time of the initial display of the thumbnails, the display control unit 110 moves the thumbnails in a direction oriented away from the middle of the screen by a movement amount less than a movement amount in the direction oriented toward the middle of the screen. For example, a change in display at the time of the initial display of the thumbnails will be described with reference to FIG. 11. FIG. 11 is a diagram illustrating an example of a change in the display at the time of initial display of the thumbnails in the information processing apparatus 100 according to the fifth modification example of the present embodiment.

First, when the operation detection unit 104 detects a thumbnail display operation, the display control unit 110 starts displaying and moving the thumbnails. For example, as illustrated in the left drawing of FIG. 11, when the operation detection unit 104 detects a thumbnail display operation, the display control unit 110 displays the category name and the thumbnails 1A to 1D corresponding to the category "Category 1" set in the initial display while moving the category name and the thumbnails 1A to 1D in a direction oriented toward the middle of the screen.

Next, the display control unit 110 continuously moves the thumbnails to move the thumbnails up to positions a predetermined amount further in the direction oriented toward the middle of the screen than movement end positions of the thumbnails. For example, as illustrated in the left middle drawing of FIG. 11, the display control unit 110 continuously moves the thumbnails 1A to 1D, passes the movement end positions of the thumbnails, and further moves the thumbnails in the direction oriented toward the middle of the screen, as illustrated in the right middle drawing of FIG. 11.

Next, the display control unit 110 moves the thumbnails toward the movement end positions of the thumbnails and ends the movement of the thumbnails. For example, as illustrated in the left drawing of FIG. 11, the display control unit 110 can move the thumbnails 1A to 1D toward the movement end positions of the thumbnails in the opposite direction to the direction oriented toward the middle of the screen and end the movement of the thumbnails.

Thus, according to the fifth modification example of the embodiment, after the display control unit 110 displays the thumbnails while moving the thumbnails in the direction oriented toward the middle of the screen at the time of the initial display of the thumbnails, the display control unit 110 moves the thumbnails in the direction oriented away from the middle of the screen by the movement amount less than the movement amount in the direction oriented toward the middle of the screen. Therefore, since the thumbnails are displayed to protrude on the display screen, it is possible to provide a comfortable operation to the user.

Sixth Modification Example

Figure 12:
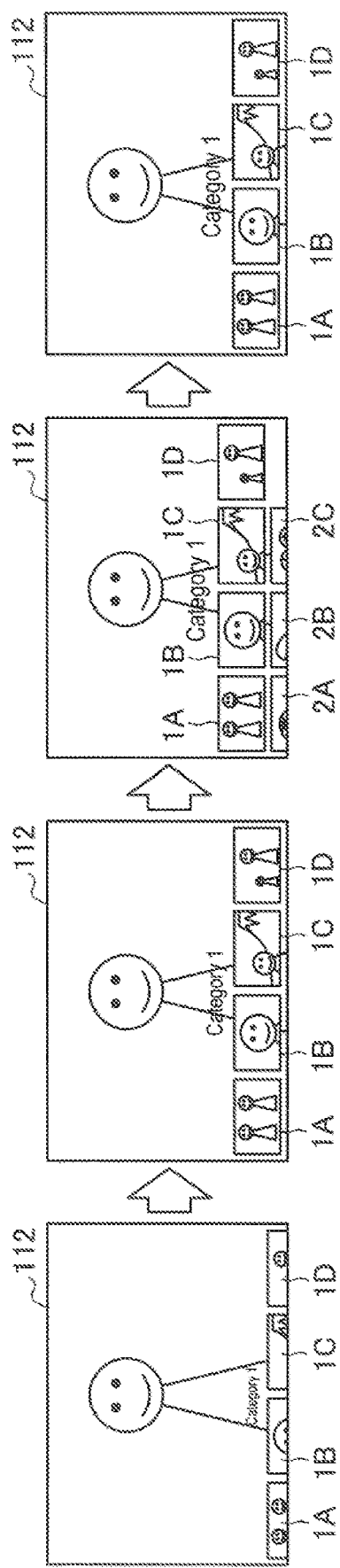
FIG. 12 is a diagram illustrating another example of a change in the display at the time of the initial display of the thumbnails in the information processing apparatus according to a sixth modification example of the present embodiment.

As a sixth modification example of the embodiment, in addition to the foregoing fifth modification example, the display control unit 110 may display parts of the thumbnails displayed by switching a category corresponding to the thumbnails when the display control unit 110 overshoots the movement of the thumbnails. Specifically, when the display control unit 110 displays the thumbnails while moving the thumbnails in the direction oriented toward the middle of the screen at the time of the initial display of the thumbnails, the display control unit 110 temporarily displays the parts of the thumbnails corresponding to content belonging to a category displayed by switching the first category after the initial display. For example, a change in the display at the time of the initial display of the thumbnails will be described with reference to FIG. 12. FIG. 12 is a diagram illustrating another example of a change in the display at the time of the initial display of the thumbnails in the information processing apparatus 100 according to the sixth modification example of the present embodiment.

First, when the operation detection unit 104 detects a thumbnail display operation, the display control unit 110 starts display and movement of the thumbnails. Since the details are substantially the same as those of the fifth modification example, the description will be omitted.

Next, the display control unit 110 continuously moves the thumbnails to move the thumbnails up to positions a predetermined amount further in the direction oriented toward the middle of the screen than the movement end positions of the thumbnails. Here, the display control unit 110 moves the thumbnails in the direction oriented toward the middle of the screen more than the movement end positions of the thumbnails and displays the parts of the thumbnails while moving the parts of the thumbnails displayed by switching the category corresponding to the thumbnails. For example, as illustrated in the left middle drawing of FIG. 12, the display control unit 110 can continuously move the thumbnails 1A to 1D past the movement end positions of the thumbnails. Then, as illustrated in the right middle drawing of FIG. 12, the display control unit 110 can move the thumbnails 1A to 1D further in the direction oriented toward the middle of the screen and can display the parts of the thumbnails 2A to 2C corresponding to the category displayed by switching the category, while moving the parts of the thumbnails 2A to 2C.

Next, the display control unit 110 moves the thumbnails toward the movement end positions of the thumbnails, moves the thumbnails displayed by switching the category in the same direction to erase the thumbnails from the display screen, and ends the movement of the thumbnails. For example, as illustrated in the left drawing of FIG. 12, the display control unit 110 can move the thumbnails 1A to 1D toward the movement end positions of the thumbnails located in the opposite direction to the direction oriented toward the middle of the screen, move the thumbnails 2A to 2D in the same direction to erase the thumbnails 2A to 2D from the display screen, and end the movement of the thumbnails.

Figure 13:
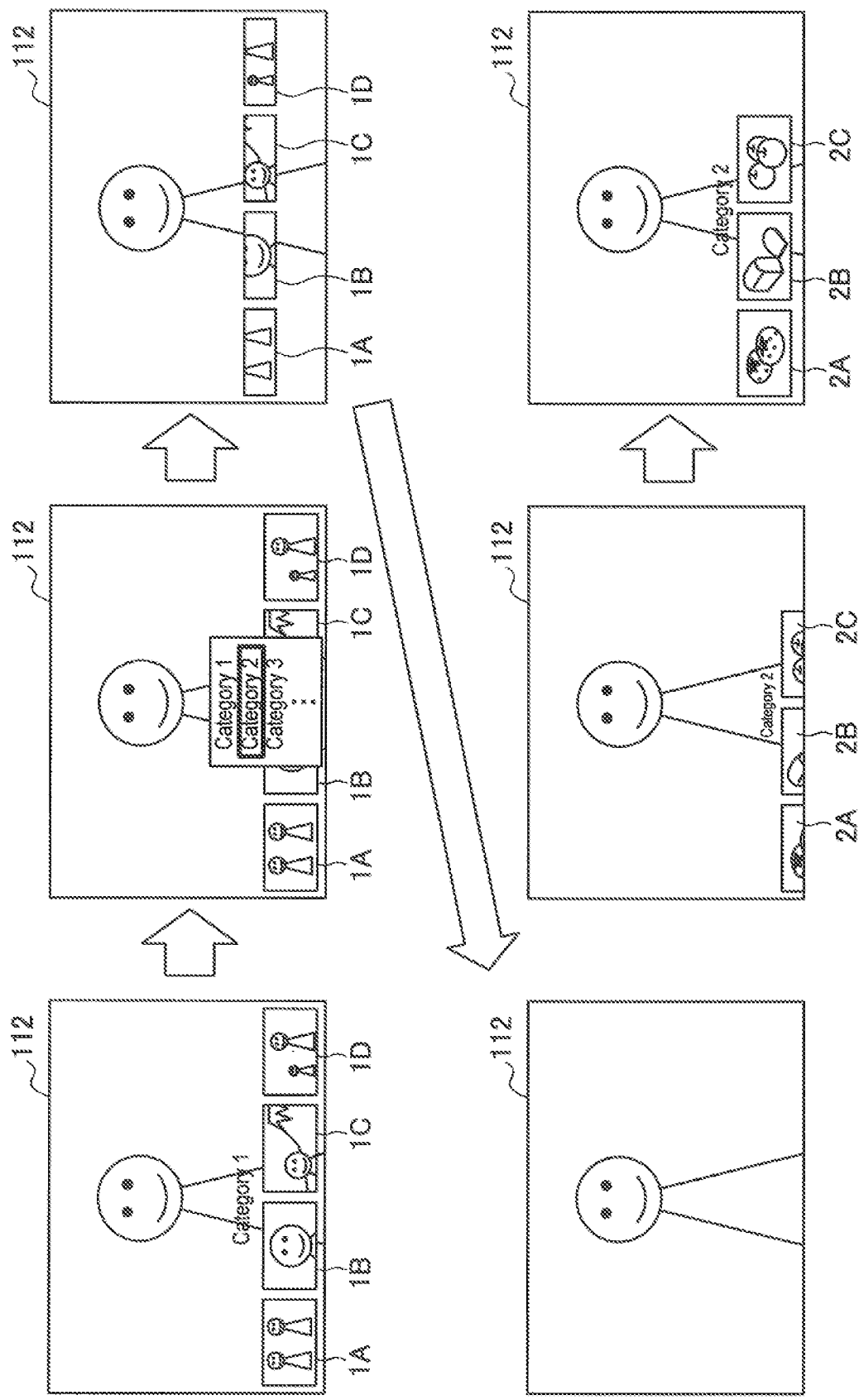
FIG. 13 is a diagram illustrating an example of a change in the display of the thumbnails through selection of a list of categories in the information processing apparatus according to a seventh modification example of the present embodiment.

Thus, according to the sixth modification example of the embodiment, when the display control unit 110 displays the thumbnails while moving the thumbnails in the direction oriented toward the middle of the screen at the time of the initial display of the thumbnails, the display control unit 110 temporarily displays the parts of the thumbnails corresponding to the content belonging to the category displayed by switching the first category after the initial display. Therefore, it is possible to show the user that there are the thumbnails corresponding to the category displayed by switching the category, Seventh Modification Example As a seventh modification example of the embodiment, the display control unit 110 may display a list of categories and change the displayed thumbnails to the thumbnails corresponding to a category selected from the list. Specifically, when the operation detection unit 104 detects an operation of displaying the list of the categories, the display control unit 110 displays the list of the categories. When the operation detection unit 104 detects an operation of selecting a category, the display control unit 110 displays thumbnails corresponding to the category subjected to the selection operation. For example, a change in the display of the thumbnails through the selection of the list of the category will be described with reference to FIG. 13. FIG. 13 is a diagram illustrating an example of a change in the display of the thumbnails through the selection of the list of the categories in the information processing apparatus 100 according to the seventh modification example of the present embodiment.

First, when the operation detection unit 104 detects a thumbnail display operation, the display control unit 110 displays a category name of the category set in the initial display, and arranges and displays the thumbnails corresponding to the category in one direction. For example, as illustrated in the left drawing of the upper end of FIG. 13, the display control unit 110 can display the category name "Category 1" of the category set in the initial display and can arrange and display the thumbnails 1A to 1D corresponding to the category in the horizontal direction below the category name.

Next, when the operation detection unit 104 detects an operation of selecting the category name, the display control unit 110 displays the list of the categories. For example, as illustrated in the middle drawing of the upper end of FIG. 13, when the operation detection unit 104 detects an operation of selecting the category name "Category 1", the display control unit 110 displays the list of the categories so that the list of the categories overlaps the thumbnails and the content being reproduced. The example in which the operation of displaying the list of the categories is the operation of selecting the category name has been described above. However, the operation of displaying the list of the categories may be an operation of pressing a category switch button or the like. When the operation of selecting the category name is cancelled or the operation of selecting the category, as will be described below, is not performed for a predetermined time, the display control unit 110 may end the overlapping display of the list of the categories.

Next, when the operation detection unit 104 detects the operation of selecting the category from the list of the categories, the display control unit 110 switches the category. For example, when the operation detection unit 104 detects an operation of selecting the category "Category 2" illustrated in the middle drawing of the upper end of FIG. 13 from the list of the categories, the display control unit 110 starts a category switching process. Then, as illustrated in the right drawing of the upper end of FIG. 13, the display control unit 110 can erase the thumbnails 1A to 1D from the display screen, as illustrated in the left drawing of the lower end of FIG. 13, by gradually erasing the thumbnails 1A to 1D and the category name corresponding to the category "Category 1" before the switching while moving the thumbnails 1A to 1D and the category name. Thereafter, as illustrated in the middle drawing and the left drawing of the lower end of FIG. 13, the display control unit 110 can display the thumbnails 2A to 2C and the category name corresponding to the switching destination category "Category 2" while moving the thumbnails 2A to 2C.

Thus, according to the seventh modification example of the embodiment, the display control unit 110 displays the list of the categories and changes the displayed thumbnails to the thumbnails corresponding to the category selected from the list of the categories. Therefore, the user displays the thumbnails corresponding to a desired category without performing the category switching operation, and thus it is possible to improve convenience of an operation.

<3. Hardware Configuration of Information Processing Apparatus According to Embodiment of Present Disclosure>

The embodiments of the present disclosure have been explained above. The processing in the information processing apparatus 100 is achieved by operating cooperatively software and hardware of the information processing apparatus 100 described below.

Figure 14:
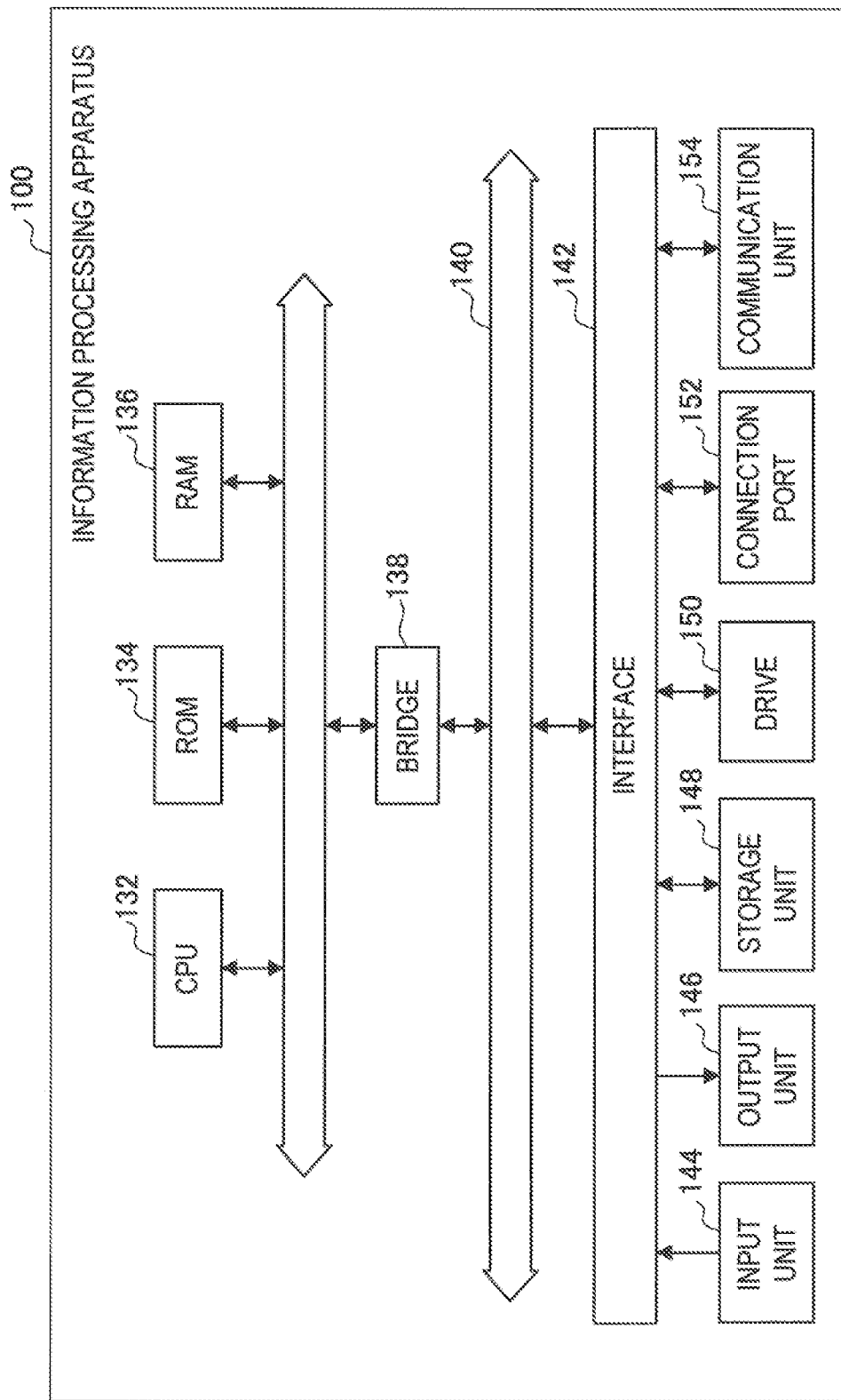
FIG. 14 is an explanatory diagram showing a hardware configuration of the information processing apparatus according to an embodiment of the present disclosure.

FIG. 14 is an explanatory diagram showing a hardware configuration of the information processing apparatus 100 according to an embodiment of the present disclosure. As illustrated in FIG. 14, the information processing apparatus 100 includes a central processing unit (CPU) 132, read only memory (ROM) 134, random access memory (RAM) 136, a bridge 138, a bus 140, an interface 142, an input unit 144, an output unit 146, a storage unit 148, a drive 150, a connection port 152, and a communication unit 154.

The CPU 132 functions as an arithmetic processing unit and a control unit, and achieves the operations of the operation detection unit 104, the category determination unit 108, and the display control unit 110 in the information processing apparatus 100 by operating cooperatively with diverse programs. The CPU 132 may be a microprocessor. The ROM 134 stores a program, a calculation parameter, and the like used by the CPU 132. The RAM 136 transiently stores programs used when the CPU 132 is executed, and various parameters that change as appropriate when executing such programs. The ROM 134 and the RAM 136 achieves a part of the storage unit in the information processing apparatus 100. The CPU 132, the ROM 134, and the RAM 136 are connected to each other via an internal bus configured of a CPU bus or the like.

The input unit 144 includes: an input mechanism used by the user for imputing information, such as a mouse, a keyboard, a touch screen, a button, a microphone, a switch, or a lever; an input control circuit configured to generate an input signal based on user input and to output the signal to the CPU 132; and the like. By operating the input unit 144, the user of the information processing apparatus 100 can input various data into the information processing apparatus 100 and instruct the information processing apparatus 100 to perform a processing operation.

As an example of the display unit 112 of the information processing apparatus 100, the output unit 146 performs output to a liquid crystal display (LCD) device, an organic light emitting diode (OLED) device, or a lamp. Further, the output unit 146 may perform sound output to a speaker or headphones.

The storage unit 148 is a unit for data storage. The storage unit 148 may include a storage medium, a recording device which records data in a storage medium, a reader device which reads data from a storage medium, a deletion device which deletes data recorded in a storage medium, and the like. The storage unit 148 stores therein the programs executed by the CPU 132 and various data.

The drive 150 is a reader/writer for a recording medium, and is incorporated in or externally attached to the information processing apparatus 100. The drive 150 reads information recorded on a removable recording medium that is mounted such as a magnetic disk, an optical disc, a magneto-optical disk, or semiconductor memory, and outputs the information to the RAM 134. The drive 150 also writes information to the removable recording medium.

The connection port 152 is a bus for connecting with peripheral equipment or an information processing apparatus external to the information processing apparatus 100, for example. The connection port 152 may be a universal serial bus (USB).

The communication unit 154 is an example of the controller communication unit 102 and the server communication unit 106 of the information processing apparatus 100 and is an example of the for example, a communication interface including a communication device for connection to a network. Further, the communication unit 154 may be a device corresponding to infrared communication, a communication device corresponding to a wireless local area network (LAN), a communication device corresponding to long term evolution (LTE), or a wire communication device that performs wired communication.

<4. Conclusion>

According to an embodiment of the present disclosure, since the user can confirm the thumbnails corresponding to the content according to the category without his or her convenience being interfered with, the efficient content retrieval is possible. Further, since the thumbnails are moved and the category is switched, it is possible to provide a comfortable operation to the user.

The preferred embodiments of the present disclosure have been described in detail with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

For example, in the foregoing embodiment, the display control unit 110 displays the thumbnails corresponding to the content belonging to one category so that the thumbnails are superimposed on the content being reproduced, but an embodiment of the present disclosure is not limited to this example. For example, the display control unit 110 may reduce the display region of the content being reproduced to a size which does not overlap the display region of the thumbnails. Therefore, it is possible to display the thumbnails without interfering with the display of the content being reproduced.

In the foregoing embodiment, the example in which the display control unit 110 arranges and displays the thumbnails in one line in one direction has been described, but the display control unit 110 may further reduce the thumbnails than in the case of the one-line display and arrange and display the thumbnails in a plurality of lines. In this case, by increasing the number of displayed thumbnails without interfering with the display of the content being reproduced, it is possible to improve efficiency of content retrieval.

The advantageous effects described in the present specification are merely descriptive and exemplary, and thus are not restrictive. That is, according to an embodiment of the technology related to the present disclosure, it is possible to obtain other advantageous effects apparent those skilled in the art along with the foregoing advantageous effects or instead of the foregoing advantageous effects from the description of the present specification.

Additionally, the present technology may also be configured as below.

(1) An information processing apparatus including:

an operation detection unit configured to detect a user's operation; and a display control unit configured to display content in a part including a middle of a display screen and display thumbnails corresponding to content belonging to one category in one direction along one side of the display screen in a region located separately from the middle of the display screen, wherein the display control unit moves the displayed thumbnails in a vertical direction with respect to the one direction according to an operation which is detected by the operation detection unit and is an operation of switching the one category to which the content corresponding to the displayed thumbnails belongs.

(2) The information processing apparatus according to (1), wherein the region is a region smaller than a display region of the content displayed on the display screen.

(3) The information processing apparatus according to (2), wherein the display control unit displays the thumbnails in a manner that a user recognizes a group to which the content corresponding to the thumbnails belongs.

(4) The information processing apparatus according to (3), wherein the display control unit displays an object indicating the group in a periphery of the thumbnails corresponding to the content belonging to the group.

(5) The information processing apparatus according to (4), wherein, when the operation detection unit detects a selection operation of selecting the thumbnail, the display control unit emphasizes display of the object indicating the group to which the content corresponding to the thumbnail subjected to the selection operation belongs.

(6) The information processing apparatus according to any one of (2) to (5), wherein the display control unit moves the thumbnails according to a user's operation detected by the operation detection unit and moves the succeeding thumbnails later with respect to the earlier moved thumbnails.

(7) The information processing apparatus according to (6), wherein, after the display control unit moves the displayed thumbnails in the vertical direction with respect to the one direction when the one category is switched, the display control unit displays thumbnails corresponding to content belonging to a subsequently displayed category while moving the thumbnails in the vertical direction with respect to the one direction.

(8) The information processing apparatus according to (6) or (7), wherein, when the operation detection unit detects a scrolling operation, the display control unit moves the thumbnails in an opposite direction to a scrolling direction by delaying the thumbnails in the scrolling direction more than the thumbnails in the opposite direction to the scrolling direction.

(9) The information processing apparatus according to (8), wherein the scrolling operation is an operation of placing an operation object in an end region of the display screen in the scrolling direction.

(10) The information processing apparatus according to (9), wherein the display control unit allows a movement speed of the thumbnail to be faster when a position of the operation object is a position closer to an end of the display screen in the end region of the display screen in the scrolling direction.

(11) The information processing apparatus according to any one of (2) to (10), wherein, after the display control unit displays the thumbnails while moving the thumbnails in a direction oriented toward the middle of the screen at a time of initial display of the thumbnails, the display control unit moves the thumbnails in a direction oriented away from the middle of the screen by a movement amount less than a movement amount in the direction oriented toward the middle of the screen.

(12) The information processing apparatus according to (11), wherein, when the display control unit displays the thumbnails while moving the thumbnails in the direction oriented toward the middle of the screen at the time of the initial display of the thumbnails, the display control unit temporarily displays parts of thumbnails corresponding to content belonging to a category displayed by switching a first category after the initial display.

(13) The information processing apparatus according to any one of (2) to (12), wherein the display control unit brings the thumbnail into focus closer to a position of an operation object than the other thumbnails.

(14) The information processing apparatus according to any one of (2) to (12), wherein, when a movement amount of an operator detected by the operation detection unit exceeds a predetermined amount, the display control unit brings the thumbnail into focus adjacent to the thumbnail brought into focus in a movement direction of the operator.

(15) The information processing apparatus according to any one of (1) to (14), wherein the display control unit displays a list of categories, and wherein, when the operation detection unit detects a category selection operation, the display control unit displays thumbnails corresponding to content belonging to the category subjected to the selection operation.

(16) The information processing apparatus according to any one of (1) to (15), wherein the display control unit displays the thumbnails in a manner that the thumbnails overlap the displayed content.

(17) An information processing method including:

detecting a user's operation;

displaying content in a part including a middle of a display screen;

displaying thumbnails corresponding to content belonging to one category in one direction along one side of the display screen in a region located separately from the middle of the display screen; and moving the displayed thumbnails in a vertical direction with respect to the one direction according to a detected operation of switching the one category to which the content corresponding to the displayed thumbnails belongs.

(18) A program causing a computer to realize:

an operation detection function of detecting a user's operation; and a display control function of displaying content in a part including a middle of a display screen, displaying thumbnails corresponding to content belonging to one category in one direction along one side of the display screen in a region located separately from the middle of the display screen, and moving the displayed thumbnails in a vertical direction with respect to the one direction according to an operation which is detected by the operation detection function and is an operation of switching the one category to which the content corresponding to the displayed thumbnails belongs.

The invention claimed is:

1. A system comprising:
a touch pad type or button type remote controller configured to generate operation information in response to an operation of switching a category, said operation being a flicking operation, in case of a touch pad type remote controller, or an operation of pressing a category switching button, in case of a button type remote controller, and
an information processing apparatus comprising:
a server communication unit configured to acquire content information from a server, the content information including thumbnails, category information for indicating the respective category to which content corresponding to the thumbnails belongs and group information for grouping the thumbnails of the content belonging to a category;
a controller communication unit configured to receive the operation information from the remote controller;
an operation detection unit configured to detect a user's operation based on the operation information received from the remote controller; and
a display control unit configured to display content in a part including a middle of a display screen and display the thumbnails corresponding to content belonging to one category indicated by the category information in one direction along one side of the display screen in a manner that the thumbnails overlap the displayed content,
wherein the display control unit is configured to
display the thumbnails in a manner that the user recognizes a group to which content corresponding to the thumbnails belongs based on the group information, and
move the displayed thumbnails in a vertical direction with respect to the one direction and toward the middle of the display screen, and gradually erase the displayed thumbnails as the displayed thumbnails are moved toward the middle of the display screen, wherein moving the displayed thumbnails and gradually erasing the displayed thumbnails are performed according to the user's operation which is detected by the operation detection unit and is an operation of switching the one category to which the content corresponding to the displayed thumbnails belongs.

2. The system according to claim 1, wherein the display control unit is configured to display an object indicating the group in a periphery of the thumbnails corresponding to the content belonging to the group.

3. The system according to claim 2, wherein, when the operation detection unit detects a selection operation of selecting the thumbnail, the display control unit emphasizes display of the object indicating the group to which the content corresponding to the thumbnail subjected to the selection operation belongs.

4. The system according to claim 1, wherein the display control unit is configured to move the thumbnails according to a user's operation detected by the operation detection unit and to move the succeeding thumbnails later with respect to the earlier moved thumbnails.

5. The system according to claim 4, wherein, when the operation detection unit detects a scrolling operation, the display control unit moves the thumbnails in an opposite direction to a scrolling direction by delaying the thumbnails in the scrolling direction more than the thumbnails in the opposite direction to the scrolling direction.

6. The system according to claim 1, wherein, after the display control unit moves the displayed thumbnails in the vertical direction with respect to the one direction when the one category is switched, the display control unit displays thumbnails corresponding to content belonging to a subsequently displayed category while moving the thumbnails in the vertical direction with respect to the one direction.

7. The system according to claim 1, wherein, after the display control unit displays the thumbnails while moving the thumbnails in a direction oriented toward the middle of the screen at a time of initial display of the thumbnails, the display control unit moves the thumbnails in a direction oriented away from the middle of the screen by a movement amount less than a movement amount in the direction oriented toward the middle of the screen.

8. The system according to claim 1, wherein the display control unit is configured to bring the thumbnail into focus closer to a position of an operation object than the other thumbnails.

9. The system according to claim 1, wherein, when a movement amount of an operator detected by the operation detection unit exceeds a predetermined amount, the display control unit brings the thumbnail into focus adjacent to the thumbnail brought into focus in a movement direction of the operator.

10. The system according to anyone of claim 1, wherein, when the display control unit displays the thumbnails, the display control unit displays parts of thumbnails corresponding to content belonging to a category displayed by switching the one category.

11. A method comprising:
generating operation information in response to an operation of switching a category by a touch pad type or button type remote controller, said operation being a flicking operation, in case of a touch pad type remote controller, or an operation of pressing a category switching button, in case of a button type remote controller, and
an information processing method comprising:
acquiring content information from a server, the content information including thumbnails, category information for indicating the respective category to which content corresponding to the thumbnails belongs and group information for grouping the thumbnails of the content belonging to a category;
receiving the operation information from the remote controller;
detecting a user's operation based on the operation information received from the remote controller;
displaying content in a part including a middle of a display screen;
displaying the thumbnails corresponding to content belonging to one category indicated by in one direction along one side of the display screen in a manner that the thumbnails overlap the displayed content;
wherein the method further comprises:
displaying the thumbnails in a manner that the user recognizes a group to which content corresponding to the thumbnails belongs based on the group information, and
moving the displayed thumbnails in a vertical direction with respect to the one direction and toward the middle of the display screen, and gradually erasing the displayed thumbnails as the displayed thumbnails are moved toward the middle of the display screen, wherein moving the displayed thumbnails and gradually erasing the displayed thumbnails are performed according to the user's operation which is an operation of switching the one category to which the content corresponding to the displayed thumbnails belongs.

12. A program causing a computer to carry out the steps of the information processing method defined in claim 11 when said program is executed by the computer.

* * * * *

UNITED STATES PATENT AND TRADEMARK OFFICE
CERTIFICATE OF CORRECTION

PATENT NO. : 11,126,343 B2
APPLICATION NO. : 16/364892
DATED : September 21, 2021
INVENTOR(S) : Seiji Suzuki et al.

It is certified that error appears in the above-identified patent and that said Letters Patent is hereby corrected as shown below:

In the Claims

Column 24, Line 26, Claim 10, the text "anyone of claim 1" should be --claim 1--.

Column 24, Line 53, Claim 11, the text "one category indicated by in one direction" should be --one category indicated by the category information in one direction--.

Signed and Sealed this
Twenty-fifth Day of April, 2023

Katherine Kelly Vidal
*Director of the United States Patent and Trademark Office*